United States Patent [19]

Narisawa et al.

[11] Patent Number: 5,728,775
[45] Date of Patent: Mar. 17, 1998

[54] HEAT-RESISTANT HIGH-NITRILE POLYMER COMPOSITIONS AND PROCESS FOR PREPARING SAME

[75] Inventors: Hiroaki Narisawa; Masahiro Kaneko; Mitsuo Kawata; Syuichi Yamaguchi; Shinichi Asai; Makoto Someda, all of Aichi, Japan

[73] Assignee: Mitsui Toatsu Chemicals, Inc., Tokyo, Japan

[21] Appl. No.: 759,961

[22] Filed: Dec. 3, 1996

[30] Foreign Application Priority Data

Dec. 11, 1995 [JP] Japan ................... 7-321668

[51] Int. Cl.$^6$ .............. C08L 51/04; C08L 33/20; C08F 279/02
[52] U.S. Cl. .................................. 525/282; 525/73
[58] Field of Search ......................... 525/282, 73

[56] References Cited

U.S. PATENT DOCUMENTS

| | | | |
|---|---|---|---|
| 3,721,724 | 3/1973 | Uebele et al. | 525/282 |
| 3,900,531 | 8/1975 | Mathews et al. | 525/282 |
| 4,205,020 | 5/1980 | Hendy et al. | 525/275 |
| 4,808,661 | 2/1989 | Iwamoto et al. | 525/73 |
| 5,091,470 | 2/1992 | Wolinski et al. | 525/71 |
| 5,412,036 | 5/1995 | Traugott et al. | 525/282 |

FOREIGN PATENT DOCUMENTS

| | | |
|---|---|---|
| 45-14549 | 5/1970 | Japan. |
| 46-25005 | 7/1971 | Japan. |
| 0011322 | 1/1984 | Japan. |
| 60-79019 | 5/1985 | Japan. |
| 61-276807 | 12/1986 | Japan. |
| 62-43448 | 2/1987 | Japan. |
| 63-268712 | 11/1988 | Japan. |
| 64-62315 | 3/1989 | Japan. |
| 2158616 | 6/1990 | Japan. |
| 3143910 | 6/1991 | Japan. |
| 3-205411 | 9/1991 | Japan. |
| 5-214201 | 8/1993 | Japan. |

*Primary Examiner*—Irina S. Zemel
*Attorney, Agent, or Firm*—Burns, Doane, Swecker & Mathis, L.L.P.

[57] ABSTRACT

A heat-resistant high-nitrile polymer composition obtained by the graft copolymerization of 100 parts by weight of a monomer mixture comprising 50 to 80% by weight of an unsaturated nitrile monomer, a maleimide monomer, an aromatic vinyl monomer, and a monomer copolymerizable with the foregoing monomers, in the presence of 1 to 40 parts by weight of a conjugated diene-based synthetic rubber containing not less than 50% by weight of a conjugated diene monomer unit, wherein the concentration of residual maleimide monomer in the polymer composition is not greater than 200 ppm by weight. This polymer composition is suitable for use as a molding material for extrusion molding, blow molding, injection molding and the like, and is useful in applications which require gas barrier properties, chemical resistance, non-adsorptive properties and the like, and which require use in automobiles, heat resistance sufficient for heat filling, and safety and hygienic properties.

16 Claims, No Drawings

HEAT-RESISTANT HIGH-NITRILE POLYMER COMPOSITIONS AND PROCESS FOR PREPARING SAME

BACKGROUND OF THE INVENTION

1) Field of the Invention

This invention relates to high-nitrile polymer compositions which are improved in heat resistance as expressed by heat distortion temperature or the like, and a process for preparing the same. More particularly, it relates to heat-resistant high-nitrile polymer compositions wherein a maleimide monomer used as a component for improving heat resistance is introduced thereinto by copolymerization and the concentration of the maleimide monomer therein remaining as an unreacted monomer is maintained at a low level, and a process for preparing the same.

2) Description of the Related Art

Rubber-modified high-nitrile polymer compositions are thermoplastic polymer compositions having impact resistance in addition to the excellent properties inherently possessed by high-nitrile polymer compositions, such as gas barrier properties, chemical resistance and non-adsorptive properties for effective ingredients in drugs and odor, and are being used as packaging materials, container materials and the like in the fields of food, agricultural chemicals, drugs, cosmetics and the like.

A typical example of such high-nitrile polymer compositions is one obtained by the graft copolymerization of an unsaturated nitrile and an acrylic ester in the presence of a conjugated diene rubber according to the process disclosed in Japanese Patent Publication No. 25005/'71. This polymer composition has excellent gas barrier properties and impact resistance and can be molded into any desired packaging and container materials according to conventional molding techniques. However, its applications have been limited because it has low heat resistance as expressed by heat distortion temperature or the like.

As a method for improving the heat resistance of a thermoplastic polymer composition, there is known a method which comprises introducing a maleimide monomer or the like thereinto by copolymerization. For example, Japanese Patent Publication No. 14549/'70 discloses a process for the preparation of a high-nitrile polymer composition by the copolymerization of acrylonitrile, an N-aryl-substituted maleimide and an olefinic unsaturated hydrocarbon. In the examples of this process which are given therein, the copolymerization is carried out by initially adding a mixture of these monomers to the polymerization system.

Moreover, Japanese Patent Laid-Open No. 79019/'85 discloses a process for the preparation of a high-nitrile polymer composition by the copolymerization of an unsaturated nitrile monomer, a maleimide monomer and a styrene monomer. In the examples of this process which are given therein, the copolymerization is carried out by initially adding a mixture of these monomers to the polymerization system.

However, since these processes do not employ graft copolymerization in the presence of rubber, the resulting polymer composition does not have good impact resistance. Moreover, since an olefinic unsaturated hydrocarbon and a styrene monomer which are highly copolymerizable with both a maleimide monomer and an unsaturated nitrile monomer are initially added to the polymerization system, they are exhausted at relatively earlier stages of the polymerization reaction. This produces a wide compositional distribution in the resulting polymer composition, leading to an insufficient improvement in heat resistance, transparency and the like.

Especially in the case of high-nitrile polymer compositions in which an unsaturated nitrile monomer having poor copolymerizability with a maleimide monomer is used in large amounts, the degrees of conversion of the unsaturated nitrile monomer and the maleimide monomer do not reach a sufficiently high level and these monomers remain in the resulting polymer composition at high concentrations. Thus, these polymer compositions are not satisfactory from the viewpoint of safety and hygiene.

On the other hand, for low-nitrile polymer compositions in which a maleimide monomer is copolymerized, for example, with an acrylonitrile-styrene resin (AS resin) or an acrylonitrile-butadiene-styrene resin (ABS resin) generally having a low content of an unsaturated nitrile monomer to be copolymerized, a number of methods for reducing the concentration of residual maleimide monomer in the polymer composition have been known.

For example, Japanese Patent Laid-Open No. 205411/'91 discloses a method for removing unreacted monomers in which, after completion of the polymerization, the reaction mixture is heated to a temperature higher than the melting temperature of the resulting polymer composition and kept under reduced pressure. However, if this method is applied to a high-nitrile polymer composition, a problem arises in that, when the residence time is sufficiently extended in order to reduce the concentration of residual monomers, the resulting polymer composition shows a significant increase in yellowness index and a reduction in Izod impact strength. Moreover, Japanese Patent Laid-Open No. 62315/'89 discloses a method for removing unreacted monomers by extracting and washing the resulting polymer composition with a solvent such as alcohol. However, if this method is applied to a high-nitrile polymer composition, common solvents such as alcohol fail to show a satisfactory extracting and removing effect because of the excellent chemical resistance possessed by the polymer composition, and are hence inadequate for the purpose of reducing the concentration of residual maleimide monomer. On the other hand, the use of a solvent (e.g., N,N-dimethylformamide) dissolving the polymer composition is disadvantageous from an industrial point of view because an additional step for reprecipitating the polymer composition from a poor solvent is required that complicates the process and, moreover, a slight amount of the solvent remains in the polymer composition.

Furthermore, Japanese Patent Laid-Open No. 268712/'88 discloses a process for the preparation of a polymer composition in which the maleimide monomer remaining in the polymerization system is reduced by increasing the addition rate of the aromatic vinyl monomer stepwise. However, this process has the disadvantage that a polymer having a very low content of an unsaturated nitrile monomer unit is formed to produce a wide compositional distribution and, therefore, the resulting polymer composition has poor chemical resistance.

An object of the present invention is to solve the above-described problems and provide high-nitrile polymer compositions having improved heat resistance and a process for preparing the same. More specifically, an object of the present invention is to provide high-nitrile polymer compositions having improved heat resistance and improved safety and hygienic properties wherein a maleimide monomer used as a component for improving heat resistance is introduced thereinto by copolymerization and the concentration of the maleimide monomer remaining therein as an unreacted monomer is maintained at a low level, and a process for preparing the same.

SUMMARY OF THE INVENTION

As a result of intensive investigations, the present inventors have found that, when a monomer mixture comprising specific amounts of an unsaturated nitrile monomer, a maleimide monomer, an aromatic vinyl monomer and a monomer copolymerizable with the foregoing monomers is subjected to graft copolymerization in the presence of a conjugated diene-based synthetic rubber, the concentration of residual maleimide monomer in the resulting polymer composition can be controlled so as to be not greater than a specific value, by initiating the polymerization reaction by the addition of an initially added monomer mixture (having a specific composition and comprising specific amounts of monomers) and a polymerization initiator to the reaction system, and thereafter adding the remaining monomers and a molecular weight modifier to the polymerization system in a specific manner. The present invention has been completed on the basis of this finding.

Thus, according to a first aspect of the present invention, there is provided a heat-resistant high-nitrile polymer composition obtained by the graft copolymerization of 100 parts by weight of a monomer mixture comprising (A) 50 to 80% by weight of an unsaturated nitrile monomer, (B) 5 to 25% by weight of a maleimide monomer, (C) 5 to 25% by weight of an aromatic vinyl monomer [provided that the amount of monomer (C) is equal to or greater than the amount of monomer (B)], and (D) 1 to 10% by weight of a monomer copolymerizable with monomers (A), (B) and (C), in the presence of 1 to 40 parts by weight of a conjugated diene-based synthetic rubber containing not less than 50% by weight of a conjugated diene monomer unit, wherein the concentration of residual maleimide monomer in the polymer composition is not greater than 200 ppm by weight.

DESCRIPTION OF THE PREFERRED EMBODIMENTS

A feature of the first aspect of the present invention is that a specific amount of a maleimide monomer is used as a component for improving the heat resistance of a high-nitrile polymer composition modified with a conjugated diene-based synthetic rubber, and an aromatic vinyl monomer is used in an amount equal to or greater than that of the maleimide monomer in order to introduce the maleimide monomer into the polymer composition by copolymerization, whereby the concentration of the maleimide monomer remaining therein as an unreacted monomer is controlled so as to be within a specific range.

According to a second aspect of the present invention, there is provided a process for the preparation of a heat-resistant high-nitrile polymer composition obtained by the graft copolymerization of 100 parts by weight of a monomer mixture comprising (A) 50 to 80% by weight of an unsaturated nitrile monomer, (B) 5 to 25% by weight of a maleimide monomer, (C) 5 to 25% by weight of an aromatic vinyl monomer [provided that the amount of monomer (C) is equal to or greater than the amount of monomer (B)], and (D) 1 to 10% by weight of a monomer copolymerizable with monomers (A), (B) and (C), in the presence of 1 to 40 parts by weight of a conjugated diene-based synthetic rubber containing not less than 50% by weight of a conjugated diene monomer unit, the process comprising the steps of (1) initiating the polymerization reaction by adding 15 to 35 parts by weight of a monomer mixture and a polymerization initiator to the reaction system, the monomer mixture comprising 65 to 99% by weight of monomer (A), 0 to 30% by weight of monomer (B), and 1 to 10% by weight of monomer (D) as initially added monomers, and (2) starting the continual addition of 65 to 85 parts by weight of the remaining monomers and a molecular weight modifier when the total degree of conversion of the monomers has reached 1 to 5% by weight (provided that the total degree of conversion of the monomers means a degree of conversion based on the total amount of the graft monomer mixture finally added to the polymerization system), the remaining monomers being added in the following manner:

(i) monomer (A) is continually added at a substantially constant rate until the total degree of conversion of the monomers reaches 70 to 80% by weight;

(ii) monomer (D) is continually added at a substantially constant rate until the total degree of conversion of the monomers reaches 70 to 80% by weight;

(iii) when monomer (B) is added as a remaining monomer, it is continually added until the total degree of conversion of the monomers reaches 5 to 80% by weight;

(iv) the molecular weight modifier is continually added at a substantially constant rate until the total degree of conversion of the monomers reaches 80 to 90% by weight;

(v) monomer (C) is added in such a way that
  1) 10 to 25% of the total amount of monomer (C) is continually added until the total degree of conversion of the monomers reaches 15 to 30% by weight,
  2) 35 to 55% of the total amount of monomer (C) is continually added from the time when the total degree of conversion of the monomers reaches 15 to 30% by weight, and till the end of the addition of all monomers (A), (B) and (D), and
  3) 25 to 45% of the total amount of monomer (C) is continually added from the end of the addition of all monomers (A), (B) and (D), and until the total degree of conversion of the monomers reaches 80 to 90% by weight; and (vi) the polymerization reaction is terminated when the total degree of conversion is increased by at least 2% by weight after the end of the addition of monomer (C).

The above-described process involves three embodiments. Specifically, a first embodiment comprises a process in which monomer (B) is not used as an initially added monomer. In this case, 15 to 35 parts by weight of a monomer mixture comprising 90 to 99% by weight of monomer (A) and 1 to 10% by weight of monomer (D) as initially added monomers is added to the reaction system, and the total amount of monomer (B) is continually added as a remaining monomer.

A second embodiment comprises a process in which monomer (B) is used both as an initially added monomer and as a remaining monomer. In this case, 15 to 35 parts by weight of a monomer mixture comprising 65 to 98% by weight of monomer (A), 1 to 30% by weight of monomer (B) and 1 to 10% by weight of monomer (D) as initially added monomers is added to the reaction system, and the remainder (i.e., the amount derived by subtracting the amount used as an initially added monomer from the total amount) of monomer (B) is continually added as a remaining monomer.

The third embodiment comprises a process in which monomer (B) is present in an amount of 5 to 10 parts by weight per 100 parts by weight of the monomer mixture, and the total amount of monomer (B) is used as an initially added monomer and not as a remaining monomer. In this case, 15 to 35 parts by weight of a monomer mixture comprising 65 to 85% by weight of monomer (A), 14 to 30 weight of monomer (B) and 1 to 10% by weight of monomer (D) as initially added monomers is added to the reaction system, and the continual addition of monomer (B) as a remaining monomer is not carried out.

A feature of the above-described process is that, as graft monomers for a conjugated diene-based synthetic rubber, a monomer mixture comprising specific amounts of an unsaturated nitrile monomer, a maleimide monomer, an aromatic vinyl monomer and a monomer copolymerizable with the foregoing monomers is used in the following manner. First of all, the polymerization reaction is initiated by adding an initially added monomer mixture (having a specific composition and comprising specific amounts of monomers) and a polymerization initiator to the reaction system. Then, graft polymerization is carried out by continually adding the remaining monomers and a molecular weight modifier to the polymerization system, during which the timings for starting and terminating the addition of each monomer or the like are specifically defined and, moreover, the addition rate of the aromatic vinyl monomer is varied.

When this process is employed to prepare rubber-modified high-nitrile polymer compositions, it becomes possible to impart heat resistance thereto while retaining the inherent properties of the rubber-modified high-nitrile polymer compositions, and control the concentration of residual maleimide monomer in the polymer compositions so as to be not greater than a specific value. Thus, there can be obtained heat-resistant high-nitrile polymer compositions which are improved both in heat resistance and in safety and hygienic properties.

More specifically, the concentration of residual maleimide monomer in the polymer compositions is controlled so as to be not greater than 200 ppm by weight. Moreover, the molded articles formed therefrom have a yellowness index of 20 to 120, an Izod impact strength of 2 to 20 kg.cm/cm, and an oxygen permeability coefficient of $1 \times 10^{-13}$ to $5 \times 10^{-12}$ cm$^3$(STP).cm/cm$^2$.sec.cmHg. The above-described polymer compositions are particularly suitable for the fabrication of hollow molded articles (eg. bottle) by blow molding, though they can also be used for injection molding and extrusion molding purposes.

The present invention is more specifically described hereinbelow. The heat-resistant high-nitrile polymer compositions of the present invention are prepared by adding specific amounts of various monomers (i.e., an unsaturated nitrile monomer, a maleimide monomer, an aromatic vinyl monomer and a monomer copolymerizable with the foregoing monomers) and a molecular weight modifier to the polymerization system in a specific manner, and subjecting these monomers to graft copolymerization in the presence of a conjugated diene-based synthetic rubber having a specific composition.

For the purpose of graft polymerization, there may be employed any of well-known polymerization techniques such as emulsion polymerization, solution polymerization, suspension polymerization, bulk polymerization and combinations thereof. However, emulsion polymerization is preferably employed with consideration for the ease of removal of the heat of polymerization and of post-treatment of the resulting polymer, the simplification of equipment for the recovery and regeneration of the organic solvent and the like, and other factors.

In the case of emulsion polymerization, the resulting polymer composition is obtained in the form of a latex. This polymer composition can be isolated, for example, by a method in which the polymer is coagulated according to any well-known technique (e.g., by treatment with an electrolyte or a solvent or by freezing), separated, washed with water and then dried.

The conjugated diene-based synthetic rubber used in the present invention is one containing not less than 50% by weight of a conjugated diene monomer. Preferably, there is used a copolymer composed of not less than 50% by weight of a conjugated diene monomer and at least one monomer copolymerizable therewith (e.g., at least one monomer selected from unsaturated nitriles, aromatic vinyl compounds and unsaturated carboxylic acid esters).

Examples of the conjugated diene monomer include 1,3-butadiene, isoprene, chloroprene, 2,3-dimethyl-1,3-butadiene and 2,3-diethyl-1,3-butadiene. From the viewpoint of easy availability and good polymerizability, 1,3-butadiene and isoprene are preferred.

The unsaturated nitriles copolymerizable with conjugated dienes include acrylonitrile, methacrylonitrile, α-chloroacrylonitrile and the like. Among them, acrylonitrile and methacrylonitrile are preferred.

The aromatic vinyl compounds copolymerizable with conjugated dienes include styrene, α-methylstyrene, vinyltoluenes, vinylxylenes and the like. Among them, styrene is preferred.

The unsaturated carboxylic acid esters copolymerizable with conjugated dienes include alkyl esters (e.g., methyl, ethyl, propyl and butyl esters) of acrylic acid and methacrylic acid. Among them, methyl acrylate, ethyl acrylate, methyl methacrylate and ethyl methacrylate are preferred.

Specifically, preferred examples of the conjugated diene-based synthetic rubber include 1,3-butadiene-acrylonitrile copolymer, 1,3-butadiene-acrylonitrile-methacrylonitrile copolymer, 1,3-butadiene-acrylonitrile-styrene copolymer and 1,3-butadiene-styrene copolymer. Among them, 1,3-butadiene-acrylonitrile copolymer and 1,3-butadiene-styrene copolymer are more preferred.

The amount of conjugated diene contained in this conjugated diene-based synthetic rubber is correlated with the impact resistance of the resulting rubber-modified heat-resistant high-nitrile polymer composition. In view of this fact, the conjugated diene-based synthetic rubber should preferably contain not less than 50% by weight, more preferably 60 to 90% by weight, of a conjugated diene monomer.

The amount of the conjugated diene-based synthetic rubber present in the heat-resistant high-nitrile polymer composition affects its impact resistance and moldability. Unduly small amounts of the conjugated diene-based synthetic rubber cause a reduction in impact resistance, while unduly large amounts thereof cause a reduction in moldability. In view of this fact, the amount of the conjugated diene-based synthetic rubber should preferably be in the range of 1 to 40% by weight, more preferably 5 to 30% by weight, based on the total weight of the heat-resistant high-nitrile polymer composition.

Specifically, according to the process of the present invention, 100 parts by weight of a graft monomer mixture as will be described later is subjected to graft copolymerization in the presence of 1 to 40 parts by weight of the conjugated diene-based synthetic rubber.

Although the conjugated diene-based synthetic rubber may be prepared according to any will-known polymerization technique, emulsion polymerization is preferred. No particular limitation is placed on the polymerization temperature. However, a temperature range of 40° to 70° C. is preferred from the viewpoint of polymerization rate, productivity and the like.

The graft monomer mixture used in the present invention is a monomer mixture comprising specific amounts of an unsaturated nitrile monomer, a maleimide monomer, an aromatic vinyl monomer and a monomer copolymerizable with the foregoing monomers.

Examples of the unsaturated nitrile monomer used as a graft monomer include acrylonitrile, methacrylonitrile and α-chloroacrylonitrile. Among them, acrylonitrile and methacrylonitrile are preferred. Properties of the rubber-modified high-nitrile polymer composition are affected by the amount of the unsaturated nitrile contained in the polymer part (or matrix part) excluding the rubber component. That is, unduly small amounts of the unsaturated nitrile cause a reduction in such properties as chemical resistance and gas barrier properties. On the other hand, unduly large amounts thereof cause a reduction in moldability and impact resistance. Moreover, the molded articles undergo yellowing and show an increase in yellowness index and a deterioration in color tone and the like. In view of this fact, the graft monomer mixture should preferably contain the unsaturated nitrile monomer in an amount of 50 to 80% by weight.

The maleimide monomer used as a graft monomer is a compound of the following general formula (1)

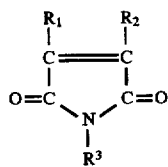

where $R_1$, $R_2$ and $R_3$ each independently represent hydrogen, a halogen, a substituted or unsubstituted alkyl group of 1 to 20 carbon atoms, or an aryl group.

Examples of the maleimide monomer include maleimide and N-substituted maleimides such as N-phenylmaleimide, N-cyclohexylmaleimide, N-o-methylphenylmaleimide, N-methylmaleimide, N-ethylmaleimide and N-butylmaleimide. Among them, N-phenylmaleimide and N-cyclohexylmaleimide are preferred.

The maleimide monomer is preferably used in an amount of 5 to 25% by weight and more preferably 5 to 20% by weight. If the amount of maleimide monomer used is greater than 25% by weight, the resulting polymer composition has a reduced melt index and poor moldability. Moreover, the polymer composition is heavily colored and it becomes difficult to reduce the concentration of residual maleimide monomer. If it is less than 5% by weight, the improvement in heat resistance is lessened.

Examples of the aromatic vinyl monomer used as a graft monomer include styrene, α-methylstyrene, vinyltoluenes and vinylxylenes. Among them, styrene and α-methylstyrene are preferred. The amount of aromatic vinyl monomer used affects the heat resistance, gas barrier properties, safety and hygienic properties and other properties of the resulting heat-resistant high-nitrile polymer composition.

This is due to the fact that, since the unsaturated nitrile monomer and the maleimide monomer have poor copolymerizability, the polymerization proceeds through the intervention of the aromatic vinyl monomer having good copolymerizability with both of those monomers. Consequently, if the amount of the aromatic vinyl monomer is excessively small, the degree of conversion of the maleimide monomer does not reach a sufficiently high level. As a result, the maleimide monomer fails to improve heat resistance satisfactorily and its residual concentration is elevated.

On the other hand, if it is excessively large, the amount of the unsaturated nitrile monomer is relatively decreased, resulting in a reduction in such properties as gas barrier properties. In view of this fact, the graft monomer mixture should contain the aromatic vinyl monomer in an amount of 5 to 25% by weight and preferably 10 to 25% by weight, and the amount of the aromatic vinyl monomer should preferably be equal to or greater than that of the maleimide monomer.

Examples of the monomer copolymerizable with the unsaturated nitrile monomer, the maleimide monomer and the aromatic vinyl monomer, which is used as a graft monomer, include unsaturated carboxylic acid esters, α-olefins, vinyl esters and vinyl ethers. Among them, unsaturated carboxylic acid esters and vinyl esters are especially preferred. These are copolymerizing monomers used to promote the internal plasticization of the resulting graft copolymer.

Specific examples of the unsaturated carboxylic acid esters include methyl acrylate, ethyl acrylate, propyl acrylates, butyl acrylates, amyl acrylates, hexyl acrylates, methyl methacrylate, ethyl methacrylate, propyl methacrylates, butyl methacrylates, amyl methacrylates, hexyl methacrylates, methyl α-chloroacrylate and ethyl α-chloroacrylate. Among them, methyl acrylate, ethyl acrylate, methyl methacrylate and ethyl methacrylate are preferred. Specific examples of the vinyl esters include vinyl acetate, vinyl propionate and vinyl butyrate. Among them, vinyl acetate is preferred. Specific examples of the α-olefins include isobutylene, 2-methyl-1-butene, 2-methyl-1-pentene, 2-methyl-1-hexene, 2-methyl-1-heptene, 2-methyl-1-octene, 2-ethyl-1-butene and 2-propyl-1-pentene. Among them, isobutylene is preferred. Specific examples of the vinyl ethers include methyl vinyl ether, ethyl vinyl ether, propyl vinyl ethers, butyl vinyl ethers, methyl isopropenyl ether and ethyl isopropenyl ether. Among them, methyl vinyl ether, ethyl vinyl ether, propyl vinyl ethers and butyl vinyl ethers are preferred.

The amount of the aforesaid copolymerizable monomer affects the moldability, heat resistance and other properties of the resulting copolymer. If its amount is excessively large, the resulting copolymer has a lowered glass transition temperature and hence improved moldability, but shows a reduction in heat resistance. In view of this fact, the aforesaid copolymerizable monomer is preferably used in an amount of 1 to 10% by weight.

Where heat-resistant high-nitrile polymer compositions are molded and used as packaging and container materials for food, agricultural chemicals, drugs, cosmetics and the like, due consideration should be given to their safety and hygienic properties so that the unreacted monomers remaining in the polymer compositions may not bleed out to the surfaces of the molded articles as a result of extraction or the like and come into contact with the contents.

In particular, the maleimide monomer has such a high boiling point that the removal of unreacted monomer under high-temperature and reduced-pressure conditions by steam stripping or the like is not effective. Consequently, it is preferable to raise its degree of conversion sufficiently in the polymerization step and thereby reduce its residual concentration.

In Supplement 2 "Dissolution Test Methods for PL Substances" attached to "Standards for the Making of Positive Lists (the edition of March, 1992)" (edited by the Council on the Hygiene of Polyolefins and the Like), a dissolution test method is described under the heading of "Service temperature, higher than 70° C. and up to 100° C.". According to this method, molded articles formed from several polymer compositions described in the examples which will be given later were subjected to dissolution tests in which they were immersed in four types of solvents (i.e., n-heptane, 20% ethanol, 4% acetic acid and water) at 40° C. for 10 days and at 90° C. for 30 minutes. After the end of the tests, the solvents were analyzed using a gas chromatograph fitted with a flame thermionic emission detector (hereinafter referred to as FTD). Thus, it has been found that, if the concentration of residual maleimide monomer in the polymer compositions is not greater than 200 ppm by weight, no maleimide monomer is detected under either of the conditions employed for the above-described PL dissolution tests (in which the detection limit is 50 ppb by weight). This indicates that a level at which the use of molded articles, for example, as food containers poses no problem from the viewpoint of safety and hygiene has been achieved. Although the concentration of residual maleimide monomer should preferably be as low as possible, its analytically detectable limit is usually of the order of 20 ppm by weight on the basis of the solubility of high-nitrile polymer compositions in solvents.

From this point of view, and with consideration for safety and hygienic properties, the practical range of the concentration of residual maleimide monomer in the polymer composition is from 20 to 200 ppm and preferably from 0 to 200 ppm.

The graft copolymerization is considered to be started when the polymerization initiator is added to the polymerization reaction system. No particular limitation is placed on the type of the polymerization initiator used in the present invention, and any well-known radical polymerization initiator may be used. Specific examples thereof include organic peroxides such as benzyl peroxide and lauryl peroxide; azo compounds such as azobisisobutyronitrile; persulfate compounds such as potassium persulfate, sodium persulfate and ammonium persulfate; and hydrogen peroxide. Where emulsion polymerization is employed, persulfate compounds (such as potassium persulfate, sodium persulfate and ammonium persulfate) and hydrogen peroxide are preferred. The polymerization initiator is preferably used in an amount of 0.02 to 0.2% by weight based on the total weight of the monomer mixture used for graft copolymerization.

The heat-resistant high-nitrile polymer composition of the present invention is a rubber-modified high-nitrile polymer composition obtained by the graft copolymerization of a monomer mixture having the aforesaid composition in the presence of a conjugated diene-based synthetic rubber. In order to control the concentration of residual maleimide monomer in the polymer composition so as to be within the aforesaid range, the aforesaid monomers and the molecular weight modifier are added to the polymerization system in a specific manner.

Specific examples of the molecular weight modifier used in the present invention include alkylmercaptans (e.g., n-dodecylmercaptan and tert-dodecylmercaptan), n-dodecyl thiolacetate, pentaerythritol tetrakis($\beta$-mercaptopropionate) and limonenedimercaptan. Among them, organic mercapto compounds having two or more mercapto groups in the molecule, such as pentaerythritol tetrakis($\beta$-mercaptopropionate) and limonenedimercaptan, are preferred because they have no substantial mercaptan odor. The molecular weight modifier is preferably used in an amount of 0.1 to 10% by weight based on the total weight of the monomer mixture used for copolymerization.

The method for controlling the concentration of residual maleimide monomer in the polymer composition involves controlling the times and rates at which the aforesaid monomers and the molecular weight modifier are added to the polymerization system, though its details may vary according to the composition of the monomer mixture, the amount of conjugated diene-based synthetic rubber used, and the like. Specific examples of the method for adding them to the polymerization system include bulk addition, continual addition, successive addition and combinations thereof. Each monomer is divided into an initially added monomer and a remaining monomer.

As used herein, the term "initially added monomers" means the monomers which are collectively or continually added to the polymerization reaction system before the addition of the polymerization initiator to the polymerization reaction system, and the term "remaining monomers" means the monomers which, after the addition of the polymerization initiator to the polymerization reaction system, are added to the polymerization reaction system in the respective amounts derived by subtracting the amounts of the initially added monomers from the total amounts of monomers finally used. The remaining monomers and the molecular weight modifier are continually added to the polymerization system after completion of the addition of the polymerization initiator, and the timings for starting and terminating the addition thereof are determined on the basis of the total degree of conversion. That is, after completion of the addition of the polymerization initiator, the addition thereof is started when the total degree of conversion comes within a predetermined range and terminated when the total degree of conversion comes within another predetermined range.

In the process of the present invention, the expression "continually adding" means that predetermined amounts of the monomers and the like are continuously or intermittently added over the period extending from the time when the total degree of conversion comes within a predetermined range and the addition of the monomers and the like is started, to the time when the total degree of conversion comes within another predetermined range and the addition of the monomers and the like is terminated. In the case of intermittent addition, this is regarded as continual addition if the time intervals are within about 15 minutes. The preferred methods for continuous addition are those using a centrifugal pump, a plunger pump or the like. When the amount added in a unit time is small in these methods, the monomers and the like may be discontinuously added as a result of the pulsation of the pump or the like.

In the process of the present invention, the expression "adding at a substantially constant rate" means that, in the operation where the addition of a given amount of monomers and the like is started when a predetermined total degree of conversion is reached, and terminated when another predetermined total degree of conversion is reached, the variation per minute of the addition rate is within about 50% by weight. The variation is preferably within 30% by weight and more preferably within 10% by weight.

The "total degree of conversion" of the graft monomer mixture means its degree of conversion based on the total amount of the graft monomer mixture finally added to the polymerization system, without regard to the addition method and addition time (initial addition or subsequent addition) of the monomer mixture. Preferably, the solid maleimide monomer is dissolved in another liquid monomer and then added to the polymerization system.

Broadly speaking, the addition of the initially added monomers is carried out according to either of the following two methods.

One method corresponds to the above-described first embodiment of the process. In this case, 15 to 35 parts by weight of a monomer mixture comprising 90 to 99% by weight of the unsaturated nitrile monomer [hereinafter referred to as monomer (A)] and 1 to 10% by weight of the monomer [hereinafter referred to as monomer (D)] copolymerizable with monomer (A), the maleimide monomer [hereinafter referred to as monomer (B)] and the aromatic vinyl monomer [hereinafter referred to as monomer (C)] is added to the reaction system. If the amount of component (A) used as the main raw material is less than 90% by weight, monomer (D) used in small amounts reacts in relatively higher proportions to produce a wide compositional distribution in the resulting polymer. If the amount of monomer (D) is less than 1% by weight, the final degree of conversion of monomer (A) is undesirably reduced. If the initially added amount of the monomer mixture is less than 15 parts by weight, the reacting amount of the monomers is correspondingly decreased, resulting in reduced efficiency. If it is greater than 35 parts by weight, the reaction rate becomes so high that it is difficult to control the molecular weight. Moreover, where emulsion polymerization is employed, a large amount of polymer precipitates in granular form and adheres to the reactor walls and the like.

The other method corresponds to the above-described second and third embodiments of the process. In this case, 15 to 35 parts by weight of a monomer mixture comprising 65 to 98% by weight of monomer (A), 1 to 30% by weight of monomer (B), and 1 to 10% by weight of monomer (D) is added to the reaction system. When the proportion of monomer (B) used in the monomer mixture is in the range of 5 to 10% by weight, the total amount of monomer (B) may be used as an initially added monomer. In this case, the remaining monomer mixture which will be described later does not contain monomer (B). If the amount of component (A) used as the main raw material is less than 65% by weight, the other monomers react in relatively higher proportions to produce a wide compositional distribution in the resulting polymer. If the amount of solid monomer (B) is greater than 30% by weight, unless heating up to about 40° C. or more, monomer (B) itself would tend to precipitate on the basis of the solubility of monomer (B) in the monomer mixture. Moreover, where emulsion polymerization is employed, the emulsion stability of the reaction system is reduced, and a large amount of polymer precipitates in granular form and adheres to the reactor walls and the like. If the amount of monomer (D) is greater than 10% by weight, a wide compositional distribution is produced again in the resulting polymer. If the amount of monomer (D) is less than 1% by weight, the final degree of conversion of monomer (A) is undesirably reduced. With regard to the initially added amount of the monomer mixture, the above-described reasons also apply to this case.

The addition of 65 to 85 parts by weight of the remaining monomer mixture and the molecular weight modifier is started after completion of the addition of the polymerization initiator and when the total degree of conversion has reached 1 to 5% by weight. If the addition thereof is started when the total degree of conversion has exceeded 5% by weight, a wide compositional distribution is produced in the resulting polymer. Moreover, its molecular weight distribution is widened, the die swell ratio is increased during molding to detract from its moldability, and a reduction in impact resistance is caused.

Monomers (A) and (D) are added at a substantially constant rate until the total degree of conversion reaches 70 to 80% by weight. If their addition is terminated before the total degree of conversion reaches 70% by weight, the rate of addition to the polymerization system becomes so high that the emulsion stability is reduced in the case of emulsion polymerization and the heat-removing capacity of the reactor needs to be enhanced. Since the graft polymerization is usually stopped at a final degree of conversion of about 90% by weight, it is preferable to terminate their addition by the time when the total degree of conversion reaches 80% by weight. If their addition is continued until the total degree of conversion exceeds 80% by weight, the polymerization time is extended in vain.

Excepting the case where the total amount of monomer (B) is used as an initially added monomer, monomer (B) is added until the total degree of conversion reaches 5 to 80% by weight. If its addition is continued until the total degree of conversion exceeds 80% by weight, the amount of unreacted monomer (B) remaining in the reaction system is increased and the improvement in the heat resistance of the resulting polymer composition is lessened. Moreover, the concentration of residual monomer (B) is undesirably increased. Monomer (B) may be added at a substantially constant rate, or its addition rate may be varied in two or three stages. Where its addition rate is varied, the addition rate in the latter half of the addition period should preferably be not greater than that in the former half thereof.

The addition rate of monomer (C) is varied in three stages. Specifically, 10 to 25% of the total amount of monomer (C) is added until the total degree of conversion reaches 15 to 30% by weight, 35 to 55% of the total amount of monomer (C) is added over the period extending from the time when the total degree of conversion reaches 15 to 30% by weight to the time when the addition of all monomers (A), (B) and (D) is terminated, and 25 to 45% of the total amount of monomer (C) is added over the period extending from the time when the addition of all monomers (A), (B) and (D) is terminated to the time when the total degree of conversion reaches 80 to 90% by weight. If the amount of monomer (C) added at the first stage is less than 10%, the polymerization rate is undesirably reduced to a considerable degree. If it is greater than 25%, the proportion of homopolymerized monomer (C) is increased to reduce the proportion of monomer (C) effectively consumed for copolymerization with monomer (B) and, moreover, a wide compositional distribution is produced. If the amount of monomer (C) added at the third stage is less than 25%, this is insufficient to copolymerize the remaining maleimide monomer and the improvement in the heat resistance of the resulting polymer composition is lessened. Moreover, the concentration of residual maleimide monomer is undesirably increased. If it is greater than 45%, a wide compositional distribution is produced. Moreover, the concentration of residual monomer (C) is increased and this is undesirable from the viewpoint of safety and hygiene. More preferably, 25 to 35% of the total amount of monomer (C) is added at the third stage. The amount of monomer (C) added at the second stage is obtained by subtracting the amounts added at the first and third stages from the total amount.

The molecular weight modifier is added at a substantially constant rate until the total degree of conversion reaches 80 to 90% by weight. If its addition is terminated when the total degree of conversion is far less than 80% by weight, a large amount of high-molecular-weight polymer is formed after that to produce a wide molecular weight distribution in the resulting polymer composition and, moreover, the die swell ratio is increased to detract from its moldability. Even if its addition is terminated when the total degree of conversion reaches about 75% by weight, the concentration of residual monomer (B) in the resulting polymer composition is undesirably increased.

The graft copolymerization reaction is stopped when the total degree of conversion is increased by at least 2% by weight, preferably 2 to 5% by weight, after the end of the continual addition of monomer (C). No particular limitation is placed on the method for stopping the reaction, and any of well-known methods may be employed. This can be accomplished, for example, by quenching the reaction mixture to a temperature lower than the reaction temperature, adding a polymerization inhibitor to the reaction mixture, or removing unreacted monomers from the reaction system.

Specific polymerization methods are described in the examples which will be given later. No particular limitation is placed on the temperature used for graft polymerization, and this may be carried out at any desired temperature in the range of 0° to 100° C. However, in consideration of the polymerization rate, the total degree of conversion of the monomers, productivity and the like, it is preferable to use a temperature in the range of 50° to 70° C. When the polymerization temperature is in the range of 55° to 60° C. and the polymerization initiator is used in an amount of 0.05 to 0.15% by weight based on the total amount of the monomers, the relationship between the total degree of conversion and the polymerization time is as follows: Approximately speaking, the time when the total degree of conversion reaches 1 to 5% by weight corresponds to 0–1 hour after the start of the polymerization, the time when the total degree of conversion reaches 15 to 30% by weight corresponds to 2–3 hours after the start of the polymerization, the time when the total degree of conversion reaches 70 to 80% by weight corresponds to 7–8 hours after the start of the polymerization, and the time when the total degree of conversion reaches 80 to 90% by weight corresponds to 8–9 hours after the start of the polymerization.

Especially where emulsion polymerization is employed for the purpose of graft polymerization, such additives as an emulsifier, a dispersant and an acid added to improve the effect of the molecular weight modifier are also used. For this purpose, any well-known additives may be used in conventionally known amounts. If necessary, other additives such as plasticizers, stabilizers, lubricants, dyes, pigments and fillers may also be added to the reaction system after completion of the polymerization.

For the purpose of graft polymerization, there may be employed any of well-known polymerization techniques such as emulsion polymerization, solution polymerization, suspension polymerization, bulk polymerization and combinations thereof.

In order to recover the polymer composition from the latex obtained by emulsion polymerization, there may be employed, for example, a method in which the polymer is coagulated by treatment with a coagulant such as an electrolyte or an organic solvent or by freezing, separated, washed with water and then dried, or a spray drying method in which the resulting latex is directly sprayed into a drying atmosphere. In consideration of energy consumption and the like, the former is preferred.

The separation of the polymer composition by treatment with a coagulant may be carried out by adding 1 to 10 parts by weight of a coagulant to 100 parts by weight (on a solid basis) of the polymer composition. Specific examples of the coagulant include aluminum sulfate, magnesium sulfate and calcium chloride.

The polymer composition separated from the latex is preferably washed with 1 to 20 times amount by weight of water. The washing water may have a temperature of about 5° to 90° C. and the washing time may range from about 10 minutes to about 2 hours.

Thereafter, the separated polymer composition is dried. Although no particular limitation is placed on the drying method, this may be done, for example, by introducing the polymer composition into a fluidized drying machine or the like and allowing it to stay in an atmosphere at 50° to 100° C. for 5 to 30 minutes.

At the time when the graft copolymerization is completed, the concentration of unreacted maleimide monomer remaining in the high-nitrile polymer composition of the present invention is not greater than 200 ppm by weight based on the polymer. Accordingly, a polymer composition containing not greater than 200 ppm of unreacted maleimide monomer can be obtained without regard to the method of post-treatment made after completion of the graft polymerization reaction. In this connection, where the polymer composition is isolated from the latex by the spray drying method, almost all of the unreacted maleimide monomer remaining in the resulting polymer is contained in the finally obtained polymer composition.

On the other hand, where the polymer composition is isolated by the method in which the polymer is coagulated by treatment with a coagulant or by freezing, separated, washed with water and then dried, about 10 to 50% of the unreacted maleimide monomer remaining in the resulting polymer is contained in the finally obtained polymer composition.

In high-nitrile polymer compositions, it is preferable from the viewpoint of gas barrier properties and chemical resistance that a polymer having an unduly low content of an unsaturated nitrile monomer unit is not contained therein. More specifically, the difference $[(\bar{x}-x)\%]$ between the content (x %) of the unsaturated nitrile monomer unit in the polymer (exclusive of rubber) formed in each unit time during graft copolymerization and the average content ($\bar{x}$ %) of the unsaturated nitrile monomer unit in the total polymer (exclusive of rubber) obtained after completion of the graft copolymerization should preferably be not greater than 25% by weight and more preferably not greater than 20% by weight. According to the process of the present invention, there can be obtained polymer compositions in which the aforesaid difference $[(\bar{x}-x)\%]$ in content is not greater than 25% by weight and more precisely not greater than 20% by weight. Thus, the high-nitrile polymer compositions prepared according to the present invention do not contain a polymer having an unduly low content of the unsaturated nitrile monomer unit and hence have excellent properties such as gas barrier properties and chemical resistance.

The polymer compositions prepared by the above-described process are thermoplastic polymer compositions which can be easily thermoformed according to conventional molding techniques for well-known thermoplastic polymer materials, such as extrusion molding, injection molding and blow molding. Moreover, they are novel polymer compositions having a very high practical value because they not only have the excellent properties inherently possessed by high-nitrile polymers, such as excellent barrier properties against gases (e.g., oxygen, nitrogen, carbon dioxide and freons) and vapors (e.g., gasoline), and excellent chemical resistance to various organic solvents, acids, bases and the like, but also show an improvement in heat resistance and in safety and hygienic properties.

The aforesaid polymer compositions can be processed according to conventional resin processing techniques such as blow molding and injection molding. In particular, the polymer compositions of the present invention can preferably be used as hollow molded articles (eg. bottle), and the techniques which can be employed to make such hollow molded articles include injection blow molding, injection-stretching blow molding, extrusion blow molding, extrusion-stretching blow molding and the like. Although the molding temperature may vary slightly according to the type of the polymer composition and the like, it is preferable to use a molding temperature in the range of 190° to 220° C. If the molding temperature is lower than 190° C., the polymer composition has an undesirably high melt viscosity and imposes an overload on the molding machine. If the molding temperature is higher than 220° C., the undesirable yellowing of the polymer composition is accelerated to cause a discoloration as a result of deterioration. From the viewpoint of handleability and the like, it is preferable that, when used to make such hollow molded articles, the heat-resistant high-nitrile polymer compositions of the present invention are pelletized (e.g., by melt-kneading them in an extruder or the like) and dried prior to blow molding.

The hollow molded articles made in the above-described manner are novel hollow molded articles having a very high practical value because they not only have the excellent properties inherently possessed by hollow molded articles formed from well-known high-nitrile polymers, such as excellent barrier properties against gases (e.g., oxygen, nitrogen, carbon dioxide and freons) and vapors (e.g., gasoline), and excellent chemical resistance to various organic solvents, acids, bases and the like, but also show an improvement in heat resistance and in safety and hygienic properties.

The heat-resistant high-nitrile polymer compositions of the present invention are suitable for use as molding materials for extrusion molding, blow molding, injection molding and the like, and are useful in applications which require gas barrier properties, chemical resistance, non-adsorptive properties and the like, and which require use in automobiles, heat resistance sufficient for heat filling, and safety and hygienic properties.

The present invention is further illustrated by the following examples and comparative examples concerning polymer compositions and the following molding examples concerning hollow molded articles. However, these examples are not to be construed to limit the scope of the present invention. In the examples and comparative examples, all parts and percentages are by weight. With regard to each of the polymer compositions described in the examples and comparative examples, the weight-average molecular weight (hereinafter referred to as Mw) of the matrix polymer excluding the copolymer grafted to the conjugated diene-based synthetic rubber, its degree of polydispersity (hereinafter referred to as Mw/Mn) defined as Mw divided by the number-average molecular weight (hereinafter referred to as Mn), the heat distortion temperature, the Vicat softening point, the Izod impact strength, the melt index, the swell, the yellowness index, the haze, the light transmittance, the total degree of conversion, the composition of the polymer, the concentration of residual maleimide monomer in the polymer composition, the concentration of residual maleimide monomer in latex (based on polymer), the oxygen permeability coefficient, and the heat resistance and drop strength of hollow molded articles were measured according to the following methods.

(1) Mw and Mw/Mn of the Matrix Polymer 0.75 g of the resulting polymer composition was dissolved in 70 ml of stirred N,N-dimethylformamide (DMF). This solution was mixed with 70 ml of acetonitrile. After stirring, this mixture was centrifugally separated into a solvent-insoluble graft polymer portion and a solvent-soluble matrix polymer portion. The matrix polymer was isolated, dried and redissolved in DMF. Using a gel permeation chromatograph (Model GPC 150-C; manufactured by Waters Co., Ltd.), this solution was analyzed at 60° C. to determine Mw, Mn and Mw/Mn as expressed in terms of polystyrene.

(2) Heat Distortion Temperature [° C.] and Vicat Softening point [° C.]

The resulting polymer composition was roll-milled at 180° C. and press-molded at 180° C. to form a 3 mm thick sheet, from which specimens were prepared. Then, using a heat distortion temperature (HDT)/Vicat softening point measuring instrument (manufactured by Toyo Seiki Seisaku-Sho, Ltd.), the heat distortion temperature was measured under a load of 4.6 kg/cm$^2$ according to the method described in JIS K-7207(B) and the Vicat softening point was measured under a load of 1 kg/cm$^2$ according to the method described in ASTM D-1525.

(3) Izod Impact Strength [kg.cm/cm]

Specimens were prepared in the same manner as described in the preceding paragraph. Then, according to the method described in ASTM D-256 (notched), measurements were made at 23° C. with an Izod impact tester (manufactured by Toyo Seiki Seisaku-Sho, Ltd.; with a weight load of 20 kgf-cm), and the Izod impact strength was calculated from a formula taking no frictional loss into account.

(4) Melt Index [g/10 min] and Swell [%]

According to the method described in ASTM D-1238, the melt index was measured at 200° C. under a load of 12.5 kg/cm$^2$ with a melt indexer (Model S-111; manufactured by Toyo Seiki Seisaku-Sho, Ltd.). The outer diameter of the rod-like piece obtained in the melt index measurement was divided by the inner diameter of the orifice. This value was expressed as a percentage and regarded as the swell.

(5) Yellowness Index

Specimens were prepared in the same manner as described in paragraph (2). Then, according to the method described in JIS K-7103, the yellowness index was measured with an SM color computer (Model SM-3; manufactured by Suga Test Instruments Co., Ltd.).

(6) Haze [%] and Light Transmittance [%]

Specimens were prepared in the same manner as described in paragraph (2). Then, according to the methods described in JIS K-6714, 6717 and ASTM D-1003, the haze and the light transmittance were measured with a haze meter (Model 300A; manufactured by Nippon Denshoku Kogyo Co., Ltd.).

(7) Total Degree of Conversion [% by weight] and Composition of Polymer [% by weight]

Total degree of conversion: The cumulative amount of polymer formed by graft polymerization till a given time or till the end of the polymerization was expressed as a weight percentage based on the total amount of graft monomers finally added to the polymerization system and regarded as the total degree of conversion.

Composition of polymer: The composition of the polymer finally formed by graft polymerization and the composition of the polymer formed by graft polymerization in each unit time were calculated. To this end, the amount of each graft monomer present in the polymerization system at time b=0 of graft polymerization was subtracted from the sum of the amount of the monomer present in the polymerization system at time a of graft polymerization and the amount of the monomer added in the period extending from time a to time b, and the resulting value (i.e., the amount of the monomer consumed by graft polymerization in the period extending from time a to time b) was regarded as the amount of the corresponding monomer unit forming the polymer. Then, the composition of the polymer was defined by the weight ratio of the amounts of various graft monomer units forming the polymer. The amounts of monomers present in the polymerization system a given time were determined by taking a sample of the polymerization mixture at that time and analyzing it with gas chromatographs (Models GC-9A and GC-14A; manufactured by Shimadzu Corp.).

(8) Concentration of Residual Maleimide Monomer in Polymer Composition [ppm by weight]

2.5 g of the resulting polymer composition was dissolved in 50 ml of stirred acetonitrile. After the solvent-insoluble portion was removed by centrifugation, this solution was subjected to GC analysis using a gas chromatograph (Model GC-14A; manufactured by Shimadzu Corp.) fitted with a capillary column. Then, the concentration of residual maleimide monomer in the polymer composition was calculated from a working curve which had previously been constructed with standard solutions.

(9) Concentration of Residual Maleimide Monomer in Latex (based on polymer)

The concentration (based on the polymer) of the maleimide monomer remaining in the latex after completion of the polymerization was calculated from the residual concentration of the maleimide monomer and the degrees of conversion of all monomers which had been determined by the gas chromatographic analysis described in paragraph (7). However, when no maleimide monomer was detected by analysis of the latex, the water obtained by separating the coagulated polymer from the latex and the water used to wash the polymer were combined, concentrated and analyzed using a gas chromatograph (Model GC-14A; manufactured by Shimadzu Corp.) fitted with a capillary column. Then, the concentration of the maleimide monomer remaining in the latex was obtained by adding the concentration in the water as calculated from a working curve previously constructed with standard solutions, to the concentration in the polymer composition as determined according to the method described in paragraph (8).

(10) Oxygen Permeability Coefficient [$cm^3$(STP).cm/$cm^2$.sec.cmHg]

Using a 50 mm$\phi$ single-screw extruder, the resulting polymer composition was melt-kneaded and pelletized at a molding temperature of 200° C. Then, using a 50 mm$\phi$ single-screw extruder fitted with a flat-slot T-die, the pelletized polymer composition was extruded at a molding temperature of 210° C. to form a film having a thickness of 30 mm.

According to the method described in JIS K-7126(A) (Differential Pressure Method), the oxygen permeability of the film was measured at 23° C. and 0% R.H. with a gas permeability measuring instrument (Model K-315-N-03; manufactured by Rika Seiki Kogyo Co., Ltd.), and the oxygen permeability coefficient was calculated therefrom. The term "STP" means standard conditions (i.e., 0° C. and 1 atmosphere).

(11) Heat Resistance of Hollow Molded Articles (degree of heat shrinkage)

Ten cylindrical hollow molded articles (bottle) formed from each polymer composition in each molding example which will be given later were heat-treated by allowing them to stand in an oven at 100° C. for one hour. Then, the body diameter of each molded article was measured with a vernier calipers (manufactured by Mitutoyo Corp.). Thereafter, the average rate of change (or the degree of heat shrinkage) as compared with untreated molded articles was calculated.

(12) Drop Strength of Hollow Molded Articles (average number of drops)

Twenty cylindrical hollow molded articles (bottles) formed from each polymer composition in each molding example which will be given later were tested. Each molded article was filled with 500 ml of water, stoppered tightly, and conditioned at 20° C. for one hour. Then, this molded article was repeatedly dropped from a height of 1.2 m so that its bottom would strike against a concrete floor. The drop strength was defined as the value (n−1) obtained by subtracting 1 from the number of drops at which the molded article was broken, and the average value (n) of 20 measurements was calculated. The number of drops was limited to 20, and the molded articles which remained intact after being dropped 20 times were rated as "not broken".

EXAMPLE 1

(i) Preparation of a Conjugated Diene-based Synthetic Rubber Latex

A polymerization reactor made of stainless steel was charged with 30 parts of acrylonitrile, 70 parts of 1,3-butadiene, 2.4 parts of a fatty acid soap, 0.3 part of azobisisobutyronitrile, 0.5 part of t-dodecylmercaptan and 200 parts of water. While this mixture was being stirred under an atmosphere of nitrogen, polymerization reaction was carried out at 45° C. for 20 hours and terminated at a degree of conversion of 90%. Unreacted monomers were removed by vacuum stripping to obtain a conjugated diene-based synthetic rubber latex having a solid content of about 30%. When the solid matter was recovered from a sample of the latex, dried and subjected to elemental analysis, the contents of 1,3-butadiene unit and acrylonitrile unit in the rubber were found to be 71% and 29%, respectively.

(ii) Preparation of a Graft Polymer

A polymerization reactor made of stainless steel was charged with 10.5 parts (on a solid basis) of the latex obtained in (i) above, 17.5 parts of acrylonitrile, 1.25 parts of methyl acrylate, 0.29 part of sodium dioctylsulfosuccinate, 0.10 part of polyvinyl pyrrolidone, 0.035 part of sodium hexametaphosphate and 150 parts of water. After this mixture was heated to 58° C. with stirring under an atmosphere of nitrogen, polymerization was initiated by starting the continuous addition of an aqueous solution containing 0.10 part of potassium persulfate as a polymerization initiator.

Thirty minutes after the start of the polymerization (at a total degree of conversion of 2%), the continuous addition of the polymerization initiator was terminated and the polymerization system was adjusted to pH 3.0 by the addition of phosphoric acid. Thereafter, the polymerization was continued at 58° C. by continuously adding additional monomers (i.e., 15 parts of acrylonitrile, 4.64 parts of N-phenylmaleimide, 2.6 parts of styrene and 1.07 parts of methyl acrylate) and a molecular weight modifier [i.e., 0.61 part of ] over a period of 2 hours.

Then, from the time of 2.5 hours after the start of the polymerization (at a total degree of conversion of 27%), the polymerization was continued at 58° C. by continuously adding 37.5 parts of acrylonitrile, 5.36 parts of N-phenylmaleimide, 8.04 parts of styrene, 2.68 parts of methyl acrylate and 1.54 parts of pentaerythritol tetrakis ($\beta$-mercaptopropionate) over a period of 5 hours.

Moreover, from the time of 7.5 hours after the start of the polymerization (at a total degree of conversion of 78%), the polymerization was continued at 58° C. by continuously adding 4.36 parts of styrene and 0.31 part of pentaerythritol tetrakis(β-mercaptopropionate) over a period of 1 hour. Apart from the monomers, 1.15 parts of sodium dioctylsulfosuccinate, 0.41 part of polyvinyl pyrrolidone, 0.14 part of sodium hexametaphosphate and 85 parts of water were continuously added at a substantially constant rate over the period of 7.5 hours after the start of the polymerization. During this polymerization, the pH of the polymerization system was maintained at about 3.0±0.3 by continuously adding phosphoric acid over the period extending from 0.5 hour to 6.0 hours after the start of the polymerization. The polymerization reaction was stopped when 9 hours elapsed after the start of the polymerization.

The polymer composition contained in the resulting latex was separated by adding aluminum sulfate to the latex in an amount of 3.7 parts by weight per 100 parts by weight of the polymer composition and mixing it with the latex to coagulate the polymer composition. The resulting polymer composition was washed with 10 times amount by weight of water at 80° C. for 100 minutes, separated by filtration, and dried at 100° C. for 10 minutes by means of a fluidized drying machine to obtain the polymer composition in powder form. Principal polymerization conditions are shown in Table 1. Properties of the resulting polymer composition were measured according to the above-described methods and the results thus obtained are shown in Table 2. The data concerning other examples are also shown in Tables 1 and 2.

EXAMPLE 2

Polymerization was carried out in the same manner as in Example 1(ii), except that the total amount of N-phenylmaleimide was continuously added at a substantially constant rate over the period extending from 0.5 hour to 6.5 hours after the start of the polymerization. Thereafter, a polymer composition in powder form was obtained in the same manner as in Example 1(ii). This will also apply to the following examples and comparative examples.

EXAMPLE 3

Polymerization was carried out in the same manner as in Example 1(ii), except that the total amount of N-phenylmaleimide was continuously added at a substantially constant rate over the period extending from 0.5 hour to 3.5 hours after the start of the polymerization; and styrene was added in an amount of 4.21 parts over the period extending from 0.5 hour to 3.5 hours after the start of the polymerization, 6.43 parts over the period extending from 3.5 hour to 7.5 hours, and 4.36 parts over the period extending from 7.5 hour to 8.5 hours.

EXAMPLE 4

Polymerization was carried out in the same manner as in Example 1(ii), except that 7.5 parts of N-phenylmaleimide was charged before the start of the polymerization and the remainder (2.5 parts) was continuously added at a substantially constant rate over the period extending from 0.5 hour to 1.5 hours after the start of the polymerization; and styrene was added in an amount of 1.3 parts over the period extending from 0.5 hour to 1.5 hours after the start of the polymerization, 9.34 parts over the period extending from 1.5 hour to 7.5 hours, and 4.36 parts over the period extending from 7.5 hour to 8.5 hours.

EXAMPLE 5

Polymerization was carried out in the same manner as in Example 1(ii), except that the total amount of N-phenylmaleimide was charged before the start of the polymerization.

EXAMPLE 6

Polymerization was carried out in the same manner as in Example 5, except that the polymerization reaction was stopped when 9.5 hours elapsed after the start of the polymerization. The resulting polymer composition was separated in the same manner as in Example 5, except that the coagulant was altered to magnesium sulfate.

EXAMPLE 7

Polymerization was carried out in the same manner as in Example 1(ii), except that the monomer addition method of Example 1(ii) was modified as follows: 13.5 parts of acrylonitrile and 1.5 parts of methyl acrylate were charged before the start of the polymerization; 10.7 parts of acrylonitrile, 10.4 parts of N-phenylmaleimide, 3.5 parts of styrene and 2.4 parts of methyl acrylate were continuously added over the period ranging from 0.5 hour to 2.5 hours after the start of the polymerization; 26.1 parts of acrylonitrile, 10.7 parts of N-phenylmaleimide, 10.7 parts of styrene and 6.1 parts of methyl acrylate were continuously added over the period ranging from 2.5 hours to 7.5 hours after the start of the polymerization; and 5.8 parts of styrene was continuously added over the period ranging from 7.5 hours to 8.5 hours after the start of the polymerization.

EXAMPLE 8

Polymerization was carried out in the same manner as in Example 1(ii), except that the monomer addition method of Example 1(ii) was modified as follows: 20 parts of acrylonitrile and 0.5 part of methyl acrylate were charged before the start of the polymerization; 17.1 parts of acrylonitrile, 3.7 parts of N-phenylmaleimide, 1.7 parts of styrene and 0.4 part of methyl acrylate were continuously added over the period ranging from 0.5 hour to 2.5 hours after the start of the polymerization; 42.9 parts of acrylonitrile, 4.3 parts of N-phenylmaleimide, 5.4 parts of styrene and 1.1 parts of methyl acrylate were continuously added over the period ranging from 2.5 hours to 7.5 hours after the start of the polymerization; and 2.9 parts of styrene was continuously added over the period ranging from 7.5 hours to 8.5 hours after the start of the polymerization.

EXAMPLE 9

Polymerization was carried out in the same manner as in Example 1(ii), except that N-cyclohexylmaleimide was used in place of N-phenylmaleimide.

EXAMPLE 10

Polymerization was carried out in the same manner as in Example 1(ii), except that vinyl acetate was used in place of methyl acrylate.

EXAMPLE 11

Polymerization was carried out in the same manner as in Example 1(ii), except that the amount of synthetic rubber latex used was altered to 5 parts (on a solid basis); and pentaerythritol tetrakis(β-mercaptopropionate) was added in an amount of 0.54 part over the period extending from 0.5 hour to 2.5 hours after the start of the polymerization, 1.34 parts over the period extending from 2.5 hour to 7.5 hours, and 0.27 part over the period extending from 7.5 hour to 8.5 hours.

EXAMPLE 12

Polymerization was carried out in the same manner as in Example 1(ii), except that the amount of synthetic rubber latex used was altered to 30 parts (on a solid basis); the amount of potassium persulfate used was altered to 0.18 part; and pentaerythritol tetrakis(β-mercaptopropionate) was added in an amount of 0.88 part over the period extending from 0.5 hour to 2.5 hours after the start of the polymerization, 2.18 parts over the period extending from 2.5 hour to 7.5 hours, and 0.44 part over the period extending from 7.5 hour to 8.5 hours.

EXAMPLE 13

Polymerization was carried out in the same manner as in Example 1(ii), except that the addition of the remaining monomers and the molecular weight modifier was started 45 minutes after the start of the polymerization and all of the succeeding operations were shifted ahead by 15 minutes.

EXAMPLE 14

Polymerization was carried out in the same manner as in Example 1(ii), except that the monomers and molecular weight modifier to be added from 7.5 hours after the start of the polymerization were added till 9 hours after the start of the polymerization, and the polymerization reaction was stopped when 10 hours elapsed after the start of the polymerization.

EXAMPLE 15

Polymerization was carried out in the same manner as in Example 1(ii), except that styrene was added in an amount of 2.25 parts over the period extending from 0.5 hour to 2.5 hours after the start of the polymerization, 6.75 parts over the period extending from 2.5 hour to 7.5 hours, and 6 parts over the period extending from 7.5 hour to 8.5 hours.
(Table 1)
(Table 2)

Comparative Example 1

Polymerization was carried out in the same manner as in Example 1(ii), except that the monomer addition method of Example 1(ii) was modified as follows: 13.5 parts of acrylonitrile and 1.5 parts of methyl acrylate were charged before the start of the polymerization; 7.6 parts of acrylonitrile, 11.6 parts of N-phenylmaleimide, 4.4 parts of styrene and 2.4 parts of methyl acrylate were continuously added over the period ranging from 0.5 hour to 2.5 hours after the start of the polymerization; 18.9 parts of acrylonitrile, 6.1 parts of N-phenylmaleimide, 13.4 parts of styrene and 5.4 parts of methyl acrylate were continuously added over the period ranging from 2.5 hours to 7.5 hours after the start of the polymerization; and 7.2 parts of styrene was continuously added over the period ranging from 7.5 hours to 8.5 hours after the start of the polymerization. Principal polymerization conditions are shown in Table 3, and the results thus obtained are shown in Table 4. Those of other comparative examples are also shown in Tables 3 and 4.

Comparative Example 2

Polymerization was carried out in the same manner as in Example 1(ii), except that the monomer addition method of Example 1(ii) was modified as follows: 21.25 parts of acrylonitrile and 0.5 part of methyl acrylate were charged before the start of the polymerization; 18.21 parts of acrylonitrile, 2.3 parts of N-phenylmaleimide, 1.4 parts of styrene and 0.4 part of methyl acrylate were continuously added over the period ranging from 0.5 hour to 2.5 hours after the start of the polymerization; 45.54 parts of acrylonitrile, 2.7 parts of N-phenylmaleimide, 4.3 parts of styrene and 1.1 parts of methyl acrylate were continuously added over the period ranging from 2.5 hours to 7.5 hours after the start of the polymerization; and 2.3 parts of styrene was continuously added over the period ranging from 7.5 hours to 8.5 hours after the start of the polymerization.

Comparative Example 3

Polymerization was carried out in the same manner as in Example 7, except that the monomer addition method of Example 7 was modified as follows: 7.5 parts of acrylonitrile, 3 parts of N-phenylmaleimide, 3 parts of styrene and 1.5 parts of methyl acrylate were charged before the start of the polymerization; 12.1 parts of acrylonitrile, 7.9 parts of N-phenylmaleimide, 3 parts of styrene and 2.4 parts of methyl acrylate were continuously added over the period ranging from 0.5 hour to 2.5 hours after the start of the polymerization; 30.4 parts of acrylonitrile, 9.1 parts of N-phenylmaleimide, 9.1 parts of styrene and 6.1 parts of methyl acrylate were continuously added over the period ranging from 2.5 hours to 7.5 hours after the start of the polymerization; and 4.9 parts of styrene was continuously added over the period ranging from 7.5 hours to 8.5 hours after the start of the polymerization.

Comparative Example 4

Polymerization was carried out in the same manner as in Example 1(ii), except that the total amount of N-phenylmaleimide was continuously added at a substantially constant rate over the period extending from 0.5 hour to 8.5 hours after the start of the polymerization.

Comparative Example 5

Polymerization was carried out in the same manner as in Example 1(ii), except that N-phenylmaleimide was added in an amount of 2.14 parts over the period extending from 0.5 hour to 2.5 hours after the start of the polymerization, 7.86 parts over the period extending from 2.5 hour to 7.5 hours, and 0 part over the period extending from 7.5 hour to 8.5 hours; and styrene was added in an amount of 3.22 parts over the period extending from 0.5 hour to 2.5 hours after the start of the polymerization, 11.78 parts over the period extending from 2.5 hour to 7.5 hours, and 0 part over the period extending from 7.5 hour to 8.5 hours.

Comparative Example 6

Polymerization was carried out in the same manner as in Example 1(ii), except that the molecular weight modifier was not added in the period extending from 7.5 hour to 8.5 hours after the start of the polymerization.

Comparative Example 7

Polymerization was carried out in the same manner as in Example 8, except that styrene was added in an amount of

23

2.5 parts over the period extending from 0.5 hour to 2.5 hours after the start of the polymerization, 5.5 parts over the period extending from 2.5 hour to 7.5 hours, and 2 parts over the period extending from 7.5 hour to 8.5 hours.

Comparative Example 8

Polymerization was carried out in the same manner as in Example 1(ii), except that the remaining monomers were continuously added at a substantially constant rate over the period extending from 0.5 hour to 7.5 hours after the start of the polymerization.

Comparative Example 9

Polymerization was carried out in the same manner as in Example 1(ii), except that all monomers were charged before the start of the polymerization.

Comparative Example 10

Polymerization was carried out in the same manner as in Comparative Example 9, except that no styrene was used as a graft monomer and N-phenylmaleimide was used in an amount of 25 parts.

With regard to Examples 1–5 and 7 and Comparative Example 3, the composition of the monomers added in each polymerization period and the composition of the graft monomer units in the polymer formed in each unit time are shown in Tables 5 to 11.

24

Molding Example 1

Using a 50 mmφ single-screw extruder, the polymer compositions obtained in Examples 1, 11 and 12 were melt-kneaded and pelletized at an extrusion temperature of 200° C. Then, using an injection-stretching blow molding machine [Model ASB-50 (with a bore diameter of 32 mm); manufactured by Nissei ASB Co., Ltd.], each of the pelletized polymer compositions was subjected to injection-stretching blow molding under conditions including a molding temperature of 215° C., a longitudinal stretch ratio of 2 and a transverse stretch ratio of 3. Thus, there were obtained cylindrical hollow molded articles (bottles having an overall length of 185 mm, a body diameter of 70 mm, a volume of 500 ml and a wall thickness of 0.5 mm).

Molding Example 2

Using an extrusion blow molding machine [Model TKVF-454H (with a bore diameter of 45 mm); manufactured by Tahara Co., Ltd.], each of the polymer compositions pelletized in Molding Example 1 was subjected to extension blow molding under conditions including a molding temperature of 210° C. and a blow ratio of 3. Thus, there were obtained cylindrical hollow molded articles (bottles having an overall length of 190 mm, a body diameter of 70 mm, a volume of 500 ml and a wall thickness of 0.8 mm).

The degree of heat shrinkage and drop strength of the hollow molded articles obtained in Molding Examples 1 and 2 were measured according to the above-described methods, and the results thus obtained are shown in Table 12.

TABLE 1

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Amounts of initially added monomers [parts by weight] | | | | | | | | | | | | | | | |
| (A) AN | 17.5 | ← | ← | 17.5 | 23.3 | ← | 13.8 | 20 | 17.5 | 17.5 | 17.5 | ← | ← | ← | ← |
| (B) NPMI | 0 | ← | ← | 7.5 | 10 | ← | 0 | 0 | CHMI 0 | 0 | 0 | ← | ← | ← | ← |
| (C) St | 0 | ← | ← | 0 | 0 | ← | 0 | 0 | 0 | 0 | 0 | ← | ← | ← | ← |
| (D) MA | 1.25 | ← | ← | 1.25 | 1.25 | ← | 1.5 | 0.5 | 1.25 | Vac 1.25 | 1.25 | ← | ← | ← | ← |
| Amount of conjugated diene-based synthetic rubber added [parts by weight] | 10.5 | ← | ← | ← | ← | ← | ← | ← | ← | ← | 5 | 30 | 10.5 | ← | ← |
| Amounts of remaining monomers [parts by weight] | | | | | | | | | | | | | | | |
| (A) AN | 52.5 | ← | ← | 52.5 | 46.7 | ← | 36.5 | 60 | 52.5 | 52.5 | 52.5 | ← | ← | ← | ← |
| (B) NPMI | 10 | ← | ← | 2.5 | 0 | ← | 20 | 8 | CHMI 10 | 10 | 10 | ← | ← | ← | ← |
| (C) St | 15 | ← | ← | 15 | 15 | ← | 20 | 10 | 15 | 15 | 15 | ← | ← | ← | ← |
| (D) MA | 3.75 | ← | ← | 3.75 | 3.75 | ← | 8.5 | 1.5 | 3.75 | Vac 3.75 | 3.75 | ← | ← | ← | ← |
| Method for the addition of remaining monomers and molecular weight modifier | | | | | | | | | | | | | | | |
| Time for starting addition [hr] | 0.5 | ← | ← | ← | ← | ← | ← | ← | ← | ← | 0.5 | ← | 0.75 | 0.5 | ← |
| Total degree of conversion at the start of addition [wt. %] | 2 | 3 | 2 | 1 | 1 | 1 | 2 | 1 | 2 | 2 | 3 | 1 | 5 | 2 | 2 |
| Time for terminating addition [hr] | | | | | | | | | | | | | | | |
| (A) AN | 7.5 | ← | ← | ← | ← | ← | ← | ← | ← | ← | 7.5 | ← | 7.75 | 7.5 | ← |
| (B) NPMI | 7.5 | 6.5 | 3.5 | 1.5 | — | ← | 7.5 | ← | CHMI 7.5 | 7.5 | ← | 7.75 | 7.5 | ← |
| (C) St | 8.5 | — | ← | ← | ← | ← | ← | ← | ← | ← | 8.5 | ← | 8.75 | 9.0 | 8.5 |
| (D) MA | 7.5 | — | ← | ← | ← | ← | ← | ← | ← | Vac 7.5 | 7.5 | ← | 7.75 | 7.5 | ← |
| Molecular weight modifier | 8.5 | ← | ← | ← | ← | ← | ← | ← | ← | ← | 8.5 | ← | 8.75 | 9.0 | 8.5 |

TABLE 1-continued

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Total degree of conversion at the end of addition (wt. %) | | | | | | | | | | | | | | | |
| (A) AN | 78 | 78 | 79 | 74 | 79 | 79 | 79 | 76 | 78 | 79 | 80 | 76 | 80 | 78 | 76 |
| (B) NPMI | 78 | 68 | 41 | 7 | — | — | 79 | 76 | CHMI 78 | 79 | 80 | 76 | 80 | 78 | 76 |
| (C) St | 85 | 85 | 85 | 80 | 85 | 85 | 86 | 83 | 85 | 86 | 87 | 83 | 87 | 88 | 85 |
| (D) MA | 78 | 78 | 79 | 74 | 79 | 79 | 79 | 76 | 78 | Vac 79 | 80 | 76 | 80 | 78 | 76 |
| Molecular weight modifier | 85 | 85 | 85 | 80 | 85 | 85 | 86 | 83 | 85 | 86 | 87 | 83 | 87 | 88 | 85 |
| Percentage of monomer (C) St added at each stage as based on total amount of (C) [%] | | | | | | | | | | | | | | | |
| ① Until the total degree of conversion reaches 15–30 wt. % | 17.3 | 17.3 | 18.7 | 19.0 | 17.3 | 17.3 | 17.5 | 17.0 | 17.3 | 17.3 | 17.3 | 17.3 | 17.3 | 17.3 | 15.0 |
| ② From the end of 1 to the end of the addition of all monomers (A), (B) and (D) | 53.6 | 53.6 | 52.2 | 51.9 | 53.6 | 53.6 | 53.5 | 54.0 | 53.6 | 53.6 | 53.6 | 53.6 | 53.6 | 53.6 | 45.0 |
| ③ From the end of 2 to the time which the total degree of conversion reaches 80–90 wt. % | 29.1 | 29.1 | 29.1 | 29.1 | 29.1 | 29.1 | 29.0 | 29.0 | 29.1 | 29.1 | 29.1 | 29.1 | 29.1 | 29.1 | 40.0 |

TABLE 2

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Composition of total monomers added [wt. %] | | | | | | | | | | | | | | | |
| (A) AN | 70 | ← | ← | ← | ← | ← | 50 | 80 | 70 | 70 | 70 | ← | ← | ← | ← |
| (B) NPMI | 10 | ← | ← | ← | ← | ← | 20 | 8 | CHMI/10 | 10 | 10 | ← | ← | ← | ← |
| (C) St | 15 | ← | ← | ← | ← | ← | 20 | 10 | 15 | 15 | 15 | ← | ← | ← | ← |
| (D) MA | 5 | ← | ← | ← | ← | ← | 10 | 2 | 5 | VAc 5 | 5 | ← | ← | ← | ← |
| Amount of conjugated diene-based synthetic rubber added [parts by weight] | 10.5 | ← | ← | ← | ← | ← | ← | ← | ← | ← | 5 | 30 | 10.5 | ← | ← |
| Composition of polymer [wt. %] | | | | | | | | | | | | | | | |
| (A) AN | 67 | 68 | 67 | 66 | 67 | 67 | 48 | 77 | 67 | 67 | 68 | 66 | 68 | 68 | 68 |
| (B) NPMI | 11 | 11 | 11 | 12 | 11 | 11 | 21 | 9 | CHMI/11 | 11 | 11 | 12 | 11 | 11 | 11 |
| (C) St | 17 | 16 | 17 | 17 | 17 | 17 | 21 | 12 | 17 | 17 | 16 | 17 | 16 | 16 | 16 |
| (D) MA | 5 | 5 | 5 | 5 | 5 | 5 | 10 | 2 | 5 | VAc 5 | 5 | 5 | 5 | 5 | 5 |
| Final degree of conversion [wt. %] | 88.3 | 88.1 | 87.7 | 82.8 | 87.7 | 89.3 | 89.0 | 85.9 | 88.4 | 88.4 | 89.2 | 87.4 | 90.0 | 92.0 | 88.1 |
| Final degree of conversion of maleimide monomer (B), its residual concentration in latex (based on polymer), and its residual concentration in polymer composition | | | | | | | | | | | | | | | |
| Final degree of conversion [wt. %] | 99.8 | 100 | 100 | 100 | 100 | 100 | 99.9 | 99.8 | 99.8 | 99.8 | 100 | 99.8 | 100 | 100 | 100 |
| Residual concentration in latex (based on polymer) [ppm by weight] | 200 | 130 | 100 | 100 | 70 | 50 | 200 | 200 | 200 | 200 | 160 | 170 | 160 | 130 | 160 |
| Residual concentration in polymer composition [ppm by weight] | 90 | 60 | 40 | 40 | 30 | 20 | 90 | 90 | 90 | 90 | 70 | 80 | 70 | 60 | 70 |
| Weight-average molecular weight (Mw) (× 10000) | 10.6 | 10.5 | 10.8 | 10.8 | 10.3 | 10.3 | 10.6 | 10.3 | 10.5 | 10.5 | 10.7 | 10.3 | 10.9 | 10.6 | 10.5 |
| Degree of polydispersity (Mw/Mn) | 1.83 | 1.86 | 1.84 | 2.00 | 1.85 | 1.85 | 1.84 | 1.84 | 1.83 | 1.83 | 1.86 | 1.80 | 1.90 | 1.82 | 1.83 |
| Physical properties | | | | | | | | | | | | | | | |
| Heat distortion temperature [°C.] | 102 | 101 | 101 | 100 | 100 | 100 | 109 | 103 | 100 | 104 | 105 | 95 | 100 | 103 | 100 |
| Vicat softening point [°C.] | 113 | 110 | 111 | 108 | 109 | 109 | 120 | 111 | 111 | 115 | 116 | 104 | 108 | 114 | 108 |
| Izod impact strength [kg-cm/cm] | 4.2 | 4.2 | 4.5 | 4.5 | 4.0 | 4.0 | 4.0 | 4.3 | 4.3 | 4.0 | 2.5 | 14 | 3.9 | 4.3 | 3.9 |
| Melt index (MI) [g/10 min] | 1.2 | 1.5 | 1.3 | 3.8 | 1.4 | 1.3 | 1.0 | 1.5 | 1.1 | 1.4 | 1.7 | 0.9 | 1.5 | 1.1 | 1.5 |

TABLE 2-continued

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 |
| Swell [%] | 100 | 102 | 102 | 109 | 105 | 105 | 102 | 103 | 100 | 100 | 115 | 100 | 102 | 100 | 102 |
| Yellowness index (YI) | 84 | 83 | 70 | 92 | 82 | 45 | 50 | 86 | 35 | 82 | 81 | 108 | 88 | 83 | 88 |
| Haze [%] | 13 | 21 | 16 | 26 | 20 | 7.4 | 14 | 15 | 9 | 11 | 12 | 15 | 20 | 12 | 20 |
| Light transmittance [%] | 62 | 58 | 64 | 53 | 56 | 73 | 61 | 60 | 70 | 63 | 61 | 69 | 57 | 63 | 57 |
| Oxygen permeability coefficient ($\times 10^{-13}$) ($cm^3$ (STP) $\cdot$ cm/$cm^2$ $\cdot$ sec $\cdot$ cmHg) | 9.7 | 9.8 | 9.9 | 10 | 10 | 10 | 46 | 6.0 | 12 | 11 | 8.8 | 15 | 12 | 10 | 12 |

TABLE 3

| | Comparative Example | | | | | | | | | |
|---|---|---|---|---|---|---|---|---|---|---|
| | 1 | 2 | 3 | 4 | 5 | 6 | 7 | 8 | 9 | 10 |
| Amounts of initially added monomers [parts by weight] | | | | | | | | | | |
| (A) AN | 13.5 | 21.3 | 7.5 | 17.5 | ← | ← | 20 | 17.5 | 70 | 70 |
| (B) NPMI | 0 | 0 | 3 | 0 | ← | ← | 0 | 0 | 10 | 25 |
| (C) St | 0 | 0 | 3 | 0 | ← | ← | 0 | 0 | 15 | 0 |
| (D) MA | 1.5 | 0.5 | 1.5 | 1.25 | ← | ← | 0.5 | 1.25 | 5 | 5 |
| Amount of conjugated diene-based synthetic rubber added [parts by weight] | 10.5 | ← | ← | ← | ← | ← | ← | ← | ← | ← |
| Amounts of remaining monomers [parts by weight] | | | | | | | | | | |
| (A) AN | 26.5 | 63.8 | 42.5 | 52.5 | ← | ← | 60 | 52.5 | — | — |
| (B) NPMI | 25 | 5 | 17 | 10 | ← | ← | 8 | 10 | — | — |
| (C) St | 25 | 8 | 17 | 15 | ← | ← | 10 | 15 | — | — |
| (D) MA | 8.5 | 1.5 | 8.5 | 3.75 | ← | ← | 1.5 | 3.75 | — | — |
| Method for the addition of remaining monomers and molecular weight modifier | | | | | | | | | | |
| Time for starting addition [hr] | 0.5 | ← | ← | ← | ← | ← | ← | ← | ← | ← |
| Total degree of conversion at the start of addition [wt. %] | 2 | 1 | 2 | 2 | 2 | 3 | 2 | 3 | 3 | 3 |
| Time for terminating addition [hr] | | | | | | | | | | |
| (A) AN | 7.5 | ← | ← | ← | ← | ← | ← | ← | — | — |
| (B) NPMI | 7.5 | ← | ← | 8.5 | 7.5 | ← | ← | ← | — | — |
| (C) St | 8.5 | ← | ← | ← | 7.5 | 8.5 | ← | 7.5 | — | — |
| (D) MA | 7.5 | ← | ← | ← | ← | ← | ← | ← | — | — |
| Molecular weight modifier | 8.5 | ← | ← | ← | ← | 7.5 | 8.5 | ← | ← | ← |
| Total degree of conversion at the end of addition (wt. %) | | | | | | | | | | |
| (A) AN | 80 | 73 | 80 | 77 | 79 | 78 | 77 | 78 | — | — |
| (B) NPMI | 80 | 73 | 80 | 84 | 79 | 78 | 77 | 78 | — | — |
| (C) St | 87 | 80 | 87 | 84 | 79 | 85 | 84 | 78 | — | — |
| (D) MA | 80 | 73 | 80 | 77 | 79 | 78 | 77 | 78 | — | — |
| Molecular weight modifier | 87 | 80 | 87 | 84 | 83 | 78 | 84 | 81 | 83 | 75 |
| Percentage of monomer (C) St added at each stage as based on total amount of (C) [%] | | | | | | | | | | |
| ① Until the total degree of conversion reaches 15–30 wt. % | 17.6 | 17.5 | 30.0 | 17.3 | 21.5 | 17.3 | 25.0 | 28.6 | 0.0 | 0.0 |

TABLE 3-continued

| | Comparative Example | | | | | | | | | |
|---|---|---|---|---|---|---|---|---|---|---|
| | 1 | 2 | 3 | 4 | 5 | 6 | 7 | 8 | 9 | 10 |
| ② From the end of 1 to the end of the addition of all monomers (A), (B) and (D) | 53.6 | 53.8 | 45.5 | 53.6 | 78.5 | 53.6 | 55.0 | 71.4 | 0.0 | 0.0 |
| ③ From the end of 2 to the time which the total degree of conversion reaches 80–90 wt. % | 28.8 | 28.8 | 24.5 | 29.1 | 0.0 | 29.1 | 20.0 | 0.0 | 0.0 | 0.0 |

TABLE 4

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Composition of total monomers added [wt. %] | (A) AN | 40 | 85 | 50 | 70 | ← | ← | 80 | 70 | ← | 70 |
| | (B) NPMI | 25 | 5 | 20 | 10 | ← | ← | 8 | 10 | ← | 25 |
| | (C) St | 25 | 8 | 20 | 15 | ← | ← | 10 | 15 | ← | 0 |
| | (D) MA | 10 | 2 | 10 | 5 | ← | ← | 2 | 5 | ← | 5 |
| Amount of conjugated diene-based synthetic rubber added [parts by weight] | | 10.5 | ← | ← | ← | ← | ← | ← | ← | ← | ← |
| Composition of polymer [wt. %] | (A) AN | 37 | 82 | 48 | 68 | 67 | 67 | 78 | 66 | 67 | 69 |
| | (B) NPMI | 26 | 6 | 21 | 11 | 11 | 11 | 9 | 11 | 11 | 26 |
| | (C) St | 27 | 10 | 21 | 16 | 17 | 17 | 11 | 18 | 17 | 0 |
| | (D) MA | 10 | 2 | 10 | 5 | 5 | 5 | 2 | 5 | 5 | 5 |
| Final degree of conversion [wt. %] | | 89.2 | 82.4 | 91.2 | 88.4 | 85.4 | 87.4 | 86.2 | 83.1 | 85.0 | 77.2 |
| Final degree of conversion of maleimide monomer (B), its residual concentration in latex (based on polymer), and its residual concentration in polymer composition | | | | | | | | | | | |
| Final degree of conversion [wt. %] | | 99.9 | 99.6 | 99.9 | 91.5 | 92.3 | 99.0 | 99.5 | 93.3 | 92.0 | 90.5 |
| Residual concentration in latex (based on polymer) [ppm by weight] | | 200 | 200 | 200 | 8600 | 8000 | 1000 | 460 | 7200 | 8400 | 27000 |
| Residual concentration in polymer composition [ppm by weight] | | 90 | 90 | 90 | 2600 | 2200 | 470 | 210 | 2200 | 2300 | 3200 |
| Weight-average molecular weight (Mw) (× 10000) | | 10.7 | 10.5 | 10.7 | 10.4 | 10.6 | 12.4 | 10.4 | 11.5 | 12.3 | 11.1 |
| Degree of polydispersity (Mw/Mn) | | 1.83 | 1.83 | 1.84 | 1.82 | 1.63 | 1.62 | 1.83 | 1.66 | 1.69 | 1.54 |
| Physical properties | | | | | | | | | | | |
| Heat distortion temperature [°C.] | | 113 | 100 | 108 | 100 | 100 | 101 | 100 | 102 | 100 | 109 |
| Vicat softening point [°C.] | | 122 | 109 | 118 | 110 | 109 | 110 | 110 | 113 | 110 | 117 |
| Izod impact strength [kg-cm/cm] | | 4.0 | 1.8 | 3.8 | 4.2 | 4.1 | 5.9 | 4.2 | 4.0 | 3.3 | 4.9 |
| Melt index (MI) [g/10 min] | | 1.1 | 0.4 | 1.0 | 1.3 | 1.1 | 1.0 | 1.5 | 1.6 | 0.3 | 0.4 |
| Swell [%] | | 109 | 100 | 103 | 100 | 100 | 102 | 102 | 100 | 102 | 124 |
| Yellowness index (YI) | | 40 | 125 | 54 | 83 | 104 | 74 | 85 | 99 | 112 | 105 |
| Haze [%] | | 15 | 14 | 21 | 12 | 25 | 15 | 14 | 30 | 43 | 23 |
| Light transmittance [%] | | 60 | 60 | 49 | 63 | 38 | 62 | 61 | 39 | 28 | 46 |
| Oxygen permeability coefficient (× $10^{-13}$) (cm$^3$ (STP) · cm/cm$^2$ · sec · cmHg) | | 112 | 2.8 | 78 | 9.6 | 9.7 | 9.7 | 5.9 | 14 | 9.7 | 9.1 |

TABLE 5

| | | (Start of polymerization) | | | Polymerization time [hr] | | | | | (End of polymerization) | | |
|---|---|---|---|---|---|---|---|---|---|---|---|---|
| Example 1 | | 0 | 0.5 | 1 | 2 | 3 | 4 | 5 | 6 | 7 | 8 | 9 |
| Composition of monomers added (wt. %) | AN | 93 | | 64 | | | | 70 | | | — | |
| | NPMI | — | | 20 | | | | 10 | | | — | |
| | St | — | | 11 | | | | 15 | | | 100 | |
| | MA | 7 | | 5 | | | | 5 | | | — | |
| Composition | AN | | 88 | 70 | 72 | 70 | 68 | 67 | 68 | 68 | 57 | 51 |

TABLE 5-continued

| Example 1 | | (Start of polymerization) | | | Polymerization time [hr] | | | | | (End of polymerization) | | | |
|---|---|---|---|---|---|---|---|---|---|---|---|---|---|
| | | 0 | 0.5 | 1 | 2 | 3 | 4 | 5 | 6 | 7 | 8 | 9 |
| of polymer formed in each unit time (wt. %) | NPMI | | — | 13 | 13 | 15 | 13 | 12 | 11 | 10 | 10 | 5 |
| | St | | — | 14 | 10 | 10 | 14 | 17 | 16 | 17 | 29 | 41 |
| | MA | | 12 | 3 | 5 | 5 | 5 | 4 | 5 | 5 | 4 | 3 |

TABLE 6

| Example 2 | | (Start of polymerization) | | | Polymerization time [hr] | | | | | (End of polymerization) | | | |
|---|---|---|---|---|---|---|---|---|---|---|---|---|---|
| | | 0 | 0.5 | 1 | 2 | 3 | 4 | 5 | 6 | 7 | 8 | 9 |
| Composition of monomers added (wt. %) | AN | 93 | | 68 | | | 66 | | | 78 | | — |
| | NPMI | — | | 15 | | | 15 | | | — | | — |
| | St | — | | 12 | | | 14 | | | 17 | | 100 |
| | MA | 7 | | 5 | | | 5 | | | — | | |
| Composition of polymer formed in each unit time (wt. %) | AN | | 90 | 68 | 73 | 73 | 66 | 66 | 64 | 64 | 64 | 54 |
| | NPMI | | — | 8 | 11 | 12 | 14 | 14 | 15 | 16 | 7 | 1 |
| | St | | — | 18 | 11 | 10 | 15 | 15 | 16 | 15 | 25 | 42 |
| | MA | | 10 | 6 | 5 | 5 | 5 | 4 | 5 | 5 | 4 | 3 |

TABLE 7

| Example 3 | | (Start of polymerization) | | | Polymerization time [hr] | | | | | (End of polymerization) | | | |
|---|---|---|---|---|---|---|---|---|---|---|---|---|---|
| | | 0 | 0.5 | 1 | 2 | 3 | 4 | 5 | 6 | 7 | 8 | 9 |
| Composition of monomers added (wt. %) | AN | 93 | | 59 | | | | 77 | | | | — |
| | NPMI | — | | 26 | | | | — | | | | — |
| | St | — | | 11 | | | | 17 | | | | 100 |
| | MA | 7 | | 4 | | | | 6 | | | | — |
| Composition of polymer formed in each unit time (wt. %) | AN | | 88 | 67 | 69 | 65 | 63 | 65 | 72 | 76 | 65 | 49 |
| | NPMI | | — | 12 | 16 | 20 | 20 | 14 | 5 | 2 | ND | ND |
| | St | | — | 15 | 10 | 10 | 13 | 16 | 18 | 17 | 31 | 47 |
| | MA | | 12 | 6 | 5 | 5 | 4 | 5 | 5 | 5 | 4 | 4 |

TABLE 8

| Example 4 | | (Start of polymerization) | | | Polymerization time [hr] | | | | | (End of polymerization) | | | |
|---|---|---|---|---|---|---|---|---|---|---|---|---|---|
| | | 0 | 0.5 | 1 | 2 | 3 | 4 | 5 | 6 | 7 | 8 | 9 |
| Composition of monomers added (wt. %) | AN | 67 | | 63 | | | | 78 | | | | — |
| | NPMI | 28 | | 21 | | | | — | | | | — |
| | St | — | | 11 | | | | 16 | | | | 100 |
| | MA | 5 | | 5 | | | | 6 | | | | — |
| Composition of polymer formed in each unit time (wt. %) | AN | | 85 | 54 | 47 | 56 | 65 | 76 | 74 | 77 | 61 | 55 |
| | NPMI | | 0 | 30 | 32 | 26 | 19 | 5 | 7 | 2 | 1 | 1 |
| | St | | — | 13 | 17 | 13 | 11 | 14 | 14 | 16 | 34 | 41 |
| | MA | | 15 | 3 | 4 | 5 | 5 | 5 | 5 | 5 | 4 | 3 |

TABLE 9

| Example 5 | | (Start of polymerization) | | | Polymerization time [hr] | | | | (End of polymerization) | | | |
|---|---|---|---|---|---|---|---|---|---|---|---|---|
| | | 0 | 0.5 | 1 | 2 | 3 | 4 | 5 | 6 | 7 | 8 | 9 |
| Composition of monomers added (wt. %) | AN | 67 | | 79 | | | | 76 | | | | — |
| | NPMI | 29 | | — | | | | — | | | | — |
| | St | — | | 15 | | | | 18 | | | 100 | |
| | MA | 4 | | 6 | | | | 6 | | | | — |
| Composition of polymer formed in each unit time (wt. %) | AN | | 90 | 51 | 49 | 64 | 71 | 76 | 72 | 75 | 55 | 55 |
| | NPMI | | 0 | 29 | 35 | 23 | 14 | 7 | 2 | 1 | 1 | ND |
| | St | | — | 14 | 13 | 9 | 10 | 12 | 20 | 19 | 40 | 42 |
| | MA | | 10 | 6 | 3 | 4 | 5 | 5 | 6 | 5 | 4 | 3 |

TABLE 10

| Example 7 | | (Start of polymerization) | | | Polymerization time [hr] | | | | (End of polymerization) | | | |
|---|---|---|---|---|---|---|---|---|---|---|---|---|
| | | 0 | 0.5 | 1 | 2 | 3 | 4 | 5 | 6 | 7 | 8 | 9 |
| Composition of monomers added (wt. %) | AN | 90 | | 41 | | | | 49 | | | | — |
| | NPMI | — | | 36 | | | | 20 | | | | — |
| | St | — | | 14 | | | | 20 | | | 100 | |
| | MA | 10 | | 9 | | | | 11 | | | | — |
| Composition of polymer formed in each unit time (wt. %) | AN | | 79 | 50 | 51 | 50 | 49 | 48 | 49 | 49 | 41 | 36 |
| | NPMI | | — | 26 | 26 | 27 | 23 | 21 | 20 | 19 | 13 | 6 |
| | St | | — | 18 | 13 | 13 | 18 | 22 | 21 | 22 | 38 | 52 |
| | MA | | 21 | 6 | 10 | 10 | 10 | 9 | 10 | 10 | 8 | 6 |

TABLE 11

| Comparative Example 3 | | (Start of polymerization) | | | Polymerization time [hr] | | | | (End of polymerization) | | | |
|---|---|---|---|---|---|---|---|---|---|---|---|---|
| | | 0 | 0.5 | 1 | 2 | 3 | 4 | 5 | 6 | 7 | 8 | 9 |
| Composition of monomers added (wt. %) | AN | 50 | | 48 | | | | 55 | | | | — |
| | NPMI | 20 | | 31 | | | | 17 | | | | — |
| | St | 20 | | 12 | | | | 17 | | | 100 | |
| | MA | 10 | | 9 | | | | 11 | | | | — |
| Composition of polymer formed in each unit time (wt. %) | AN | | 7 | 21 | 38 | 52 | 58 | 55 | 54 | 52 | 49 | 41 |
| | NPMI | | 43 | 42 | 39 | 24 | 16 | 17 | 18 | 18 | 9 | ND |
| | St | | 44 | 32 | 16 | 14 | 15 | 17 | 18 | 19 | 32 | 49 |
| | MA | | 6 | 5 | 7 | 10 | 11 | 11 | 10 | 11 | 10 | 10 |

TABLE 12

| Polymer composition used as molding material | Heat resistance of hollow molded articles (degree of heat shrinkage) [%] | | Drop strength of hollow molded articles (average number of drops) | |
|---|---|---|---|---|
| | Molding Example 1 | Molding Example 2 | Molding Example 1 | Molding Example 2 |
| Example 1 | 1.0 | 0.6 | 15 | 3 |
| Example 11 | 1.1 | 0.7 | 12 | 2 |
| Example 12 | 1.3 | 0.9 | Not broken | Not broken |

BRIEF DESCRIPTION OF THE TABLES

Tables 1 and 3 are tables which, with regard to each of the polymer compositions described in the examples and the comparative examples and the process for preparing it, show the amounts of the initially added monomers and the remaining monomers, the amount of conjugated diene-based synthetic rubber added, the times for starting and terminating the addition of the remaining monomers and the molecular weight modifier [the time when the addition of the polymerization initiator was started (i.e., the polymerization was initiated) is defined as zero time], the total degrees of conversion at the start and end of the addition, and the percentage (%) of monomer (C) (whose addition rate was varied) added at each stage as based on the total amount of monomer (C).

Tables 2 and 4 are tables which, with regard to each of the polymer compositions described in the examples and the comparative examples, show the composition of the total monomers added for the polymerization and the composition of the polymer, the amount of conjugated diene-based synthetic rubber added, the final degree of conversion of all monomers, the final degree of conversion of maleimide monomer (B), its residual concentration (based on the polymer) in the latex, and its residual concentration in the polymer composition, the weight-average molecular weight (Mw), the degree of polydispersity (molecular weight distribution: Mw/Mn) defined as Mw divided by the number-average molecular weight (Mn), the heat distortion temperature (hereinafter referred to as HDT), the Vicat softening point, the Izod impact strength (or Izod value), the melt index (hereinafter referred to as the MI value), the swell, the yellowness index (hereinafter referred to as the YI value), the haze, the light transmittance and the oxygen permeability coefficient.

In these tables, AN stands for acrylonitrile, NPMI for N-phenylmaleimide, St for styrene, MA for methyl acrylate, CHMI for N-cyclohexylmaleimide, and VAc for vinyl acetate.

Tables 5 to 11 are tables which, with regard to Examples 1–5 and 7 and Comparative Example 3, show the composition of the monomers added for graft polymerization and the composition of the graft monomer units in polymer formed in each unit time.

Table 12 is a table showing the degree of heat shrinkage and drop strength of hollow molded articles obtained by subjecting the polymer compositions obtained in Examples 1, 11 and 12 to injection-stretching blow molding or extrusion blow molding.

Discussion on Examples and Comparative Examples

In high-nitrile polymer compositions obtained by the polymerization of a monomer mixture containing not less than 50% by weight of an unsaturated nitrile monomer, molding at high temperatures is undesirable because high molding temperatures cause deterioration accompanying a yellowing in color. Accordingly, it is preferable that they have a high MI value of at least 1 g/10 min. Moreover, where such polymer compositions are blow-molded to make, for example, containers and parts to be disposed in the interior of automobiles or the like, and packaging containers capable of heat filling, it is preferable that they have high heat resistance as expressed by an HDT of at least 100° C. Furthermore, where such polymer compositions are molded to form, for example, packaging materials which may come into contact with food and drugs, it is important that the unreacted maleimide monomer remaining in the polymer compositions does not dissolve out. Accordingly, it is preferable that the concentration of residual maleimide monomer is sufficiently low. In practice, the concentration of residual maleimide monomer must be not greater than 200 ppm by weight.

According to the present invention, rubber-modified high-nitrile polymer compositions can be improved in heat resistance and in safety and hygienic properties, as compared with the prior art. Specifically, in Examples 1 to 15 where the graft monomer mixture comprises 50 to 80% by weight of an unsaturated nitrile monomer, 5 to 25% by weight of a maleimide monomer, 5 to 25% by weight of an aromatic vinyl monomer (but in an amount equal to or greater than that of the maleimide monomer), and 1 to 10% by weight of a monomer copolymerizable with the foregoing monomers and where the method for the addition of these monomers and a molecular weight modifier is within the scope of the present invention, the resulting polymer compositions substantially achieve an MI value of 1 g/10 min. Moreover, they have heat resistance as expressed by an HDT of the order of 100° C., a yellowness index of 20 to 120, an Izod impact strength of 2 to 20 kg.cm/cm, and an oxygen permeability coefficient of $1 \times 10^{-13}$ to $5 \times 10^{-12}$ cm$^3$(STP).cm/cm$^2$.sec.cmHg. In addition, the concentration of residual maleimide monomer is controlled so as to be not greater than 200 ppm by weight, and a level at which no maleimide monomer is detected in dissolution tests is achieved.

Hollow molded articles made by blow molding of the polymer compositions of the present invention also have heat resistance of the order of 100° C. Moreover, their drop strength reaches a practically useful level.

On the other hand, in Comparative Example 1 where the graft monomer mixture contains less than 50% by weight of acrylonitrile, the resulting polymer composition has poor gas barrier properties as expressed by an high oxygen permeability coefficient. Contrarily, in Comparative Example 2 where the graft monomer mixture contains more than 80% by weight of acrylonitrile, the resulting polymer composition fails to achieve an MI value of 1 g/10 min and hence has low processing fluidity. Moreover, this polymer composition has a high yellowness index and shows a reduction in color tone. In Comparative Example 3 where the composition of the initially added monomers is outside the scope of the present invention, a polymer having a significantly low acrylonitrile content is formed as shown in Table 11. Moreover, the resulting polymer composition shows a reduction in gas barrier properties. In Comparative Example 4 where, of the remaining monomers, the method for the addition of N-phenylmaleimide is outside the scope of the present invention, Comparative Example 5 where the addition rates of N-phenylmaleimide and styrene were increased stepwise and no styrene was added after completion of the addition of acrylonitrile, N-phenylmaleimide and methyl acrylate, and Comparative Example 8 where the remaining monomers were added at a substantially constant rate and no styrene was added after completion of the addition of acrylonitrile, N-phenylmaleimide and methyl acrylate, the final degree of conversion of N-phenylmaleimide is low and its residual concentration is above the limit of the present invention. Moreover, the polymer compositions obtained in Comparative Examples 5 and 8 have low transparency. In Comparative Example 6 where the method for the addition of the remaining monomers is within the scope of the present invention, but the method for the addition of the molecular weight modifier is outside the scope of the present invention, and Comparative Example 7 where the proportion of styrene added after completion of the addition of acrylonitrile, N-phenylmaleimide and methyl acrylate is outside the range of the present invention, the concentration of residual N-phenylmaleimide is not sufficiently reduced and is above the limit of the present invention. Furthermore, in Comparative Examples 9 and 10 where all monomers were initially added at a time, the final degree of conversion of N-phenylmaleimide is low and its residual concentration is above the limit of the present invention. Moreover, the resulting polymer compositions fail to achieve an MI value of 1 g/10 min and hence have low processing fluidity. Moreover, they show a reduction in transparency. Especially in Comparative Example 10 where no styrene was used, the final degree of conversion of all monomers is also low and the concentration of residual N-phenylmaleimide is markedly higher.

What is claimed is:

1. A heat-resistant high-nitrile polymer composition obtained by graft copolymerization of 100 parts by weight of monomers comprising (A) 50 to 80% by weight of an unsaturated nitrile monomer, (B) 5 to 25% by weight of a maleimide monomer, (C) 5 to 25% by weight of an aromatic vinyl monomer, and (D) 1 to 10% by weight of a monomer copolymerizable with monomers (A), (B) and (C), in the presence of 1 to 40 parts by weight of a conjugated diene-based synthetic rubber containing not less than 50% by weight of a conjugated diene monomer unit, wherein the concentration of residual maleimide monomer in the polymer composition is not greater than 200 ppm by weight.

2. A heat-resistant high-nitrile polymer composition as claimed in claim 1 wherein the yellowness index is in the range of 20 to 120.

3. A heat-resistant high-nitrile polymer composition as claimed in claim 1 wherein the Izod impact strength is in the range of 2 to 20 kg.cm/cm.

4. A heat-resistant high-nitrile polymer composition as claimed in claim 1 wherein the oxygen permeability coefficient is in the range of $1 \times 10^{-13}$ to $5 \times 10^{-12}$ cm$^3$ (STP).cm/cm$^2$.sec.cmHg.

5. A heat-resistant high-nitrile polymer composition as claimed in claim 4 which can be blow-molded into hollow molded articles.

6. A process for the preparation of a heat-resistant high-nitrile polymer composition obtained by graft copolymerization of 100 parts by weight of monomers comprising (A) 50 to 80% by weight of an unsaturated nitrile monomer, (B) 5 to 25% by weight of a maleimide monomer, (C) 5 to 25% by weight of an aromatic vinyl monomer, and (D) 1 to 10% by weight of a monomer copolymerizable with monomers (A), (B) and (C), in the presence of 1 to 40 parts by weight of a conjugated diene-based synthetic rubber containing not less than 50% by weight of a conjugated diene monomer unit, the process comprising the steps of (1) initiating the polymerization reaction by adding 15 to 35 parts by weight of a monomer mixture and a polymerization initiator to the reaction system, the monomer mixture comprising 65 to 99% by weight on monomer (A), 0 to 30% by weight of monomer (B), and 1 to 10% by weight of monomer (D) as initially added monomers, and (2) starting the continual addition of 65 to 85 parts by weight of the remaining monomers and a molecular weight modifier when the total degree of conversion of the monomers has reached 1 to 5% by weight (provided that the total degree of conversion of the monomers means a degree of conversion based on the total amount of the monomers finally added to the polymerization system), the remaining monomers being added in the following manner:

(i) monomer (A) is continually added at a substantially constant rate until the total degree of conversion of the monomers reaches 70 to 80% by weight;

(ii) monomer (D) is continually added at a substantially constant rate until the total degree of conversion of the monomers reaches 70 to 80% by weight;

(iii) When monomer (B) is added as a remaining monomer, it is continually added until the total degree of conversion of the monomers reaches 5 to 80% by weight;

(iv) the molecular weight modifier is continually added at a substantially constant rate until the total degree of conversion of the monomers reaches 80 to 90% by weight;

(v) monomer (C) is added in such a way that 1) 10 to 25% of the total amount of monomer (C) is continually added until the total degree of conversion of the monomers reaches 15 to 30% by weight, 2) 35 to 55% of the total amount of monomer (C) is continually added from the time when the total degree of conversion of the monomers reaches 15 to 30% by weight, and till the end of the addition of all monomers (A), (B) and (D), and 3) 25 to 45% of the total amount of monomer (C) is continually added from the end of the addition of all monomers (A), (B) and (D), and until the total degree of conversion of the monomers reaches 80 to 90% by weight; and (vi) the polymerization reaction is terminated when the total degree of conversion is increased by at least 2% by weight after the end of the addition of monomer (C).

7. A process for the preparation of a heat-resistant high-nitrile polymer composition as claimed in claim 6 wherein monomer (B) is not used as an initially added monomer, but the total amount thereof is used as a remaining monomer.

8. A process for the preparation of a heat-resistant high-nitrile polymer composition as claimed in claim 6 wherein monomer (B) is used both as an initially added monomer and as a remaining monomer.

9. A process for the preparation of a heat-resistant high-nitrile polymer composition as claimed in claim 6 wherein monomer (B) constitutes 5 to 10% by weight of 100 parts by weight of the monomer mixture and the total amount thereof is used as an initially added monomer and not as a remaining monomer.

10. A process for the preparation of a heat-resistant high-nitrile polymer composition as claimed in claim 6 wherein the concentration of residual maleimide monomer in the polymer composition is controlled so as to be not greater than 200 ppm by weight.

11. A process for the preparation of a heat-resistant high-nitrile polymer composition as claimed in claim 6 wherein the yellowness index of the polymer composition is in the range of 20 to 120.

12. A process for the preparation of a heat-resistant high-nitrile polymer composition as claimed in claim 6 wherein the Izod impact strength of the polymer composition is in the range of 2 to 20 kg.cm/cm.

13. A process for the preparation of a heat-resistant high-nitrile polymer composition as claimed in claim 6 wherein the oxygen permeability coefficient of the polymer composition is in the range of $1 \times 10^{-13}$ to $5 \times 10^{-12}$ cm$^3$(STP).cm/cm$^2$.sec.cmHg.

14. A heat-resistant high-nitrile polymer composition as claimed in claim 3 which can be blow-molded into hollow molded articles.

15. A heat-resistant high-nitrile polymer composition as claimed in claim 2 which can be blow-molded into hollow molded articles.

16. A heat-resistant high-nitrile polymer composition as claimed in claim 1 which can be blow-molded into hollow molded articles.

* * * * *